US006829524B2

(12) United States Patent
Chee

(10) Patent No.: US 6,829,524 B2
(45) Date of Patent: Dec. 7, 2004

(54) METHOD AND APPARATUS FOR ESTIMATING YAW RATE IN A WHEELED VEHICLE AND STABILITY SYSTEM

(75) Inventor: Wonshik Chee, Bay Side, WI (US)

(73) Assignee: Wisys Technology Foundation, Inc., Madison, WI (US)

( * ) Notice: Subject to any disclaimer, the term of this patent is extended or adjusted under 35 U.S.C. 154(b) by 0 days.

(21) Appl. No.: 10/225,046

(22) Filed: Aug. 20, 2002

(65) Prior Publication Data

US 2003/0078700 A1 Apr. 24, 2003

Related U.S. Application Data

(60) Provisional application No. 60/313,716, filed on Aug. 20, 2001.

(51) Int. Cl.$^7$ ................................................. G06F 7/00
(52) U.S. Cl. ............................... 701/1; 701/38; 701/41; 280/5.507; 303/140
(58) Field of Search ............................... 701/41, 1, 37, 701/38; 280/5.507, 5.515, 6.158; 303/140, 146, 147

(56) References Cited

U.S. PATENT DOCUMENTS

| | | | |
|---|---|---|---|
| 4,287,765 A | | 9/1981 | Kreft |
| 4,321,678 A | | 3/1982 | Krogmann |
| 4,691,798 A | | 9/1987 | Engelbach |
| 4,840,389 A | | 6/1989 | Kawabe et al. |
| 5,029,090 A | | 7/1991 | Kuhn et al. |
| 5,124,938 A | | 6/1992 | Algrain |
| 5,172,323 A | | 12/1992 | Schmidt |
| 5,217,246 A | * | 6/1993 | Williams et al. .......... 280/5.507 |
| 5,228,757 A | | 7/1993 | Ito et al. |
| 5,247,466 A | | 9/1993 | Shimada et al. |
| 5,289,379 A | * | 2/1994 | Williams ...................... 701/37 |
| 5,291,406 A | * | 3/1994 | Williams et al. ............... 701/37 |
| 5,297,045 A | * | 3/1994 | Williams et al. ............... 701/37 |
| 5,369,580 A | | 11/1994 | Monji et al. |
| 5,371,677 A | | 12/1994 | Ehret et al. |
| 5,408,411 A | | 4/1995 | Nakamura et al. |
| 5,428,536 A | | 6/1995 | Ackermann |
| 5,475,593 A | * | 12/1995 | Townend ...................... 701/38 |
| 5,590,898 A | * | 1/1997 | Williams et al. .......... 280/5.507 |
| 5,627,751 A | | 5/1997 | Davis et al. |
| 5,732,377 A | | 3/1998 | Eckert |
| 5,878,357 A | | 3/1999 | Sivashankar et al. |

(List continued on next page.)

OTHER PUBLICATIONS

Analog Devices "High Accuracy ± 1 g to ± 5 g Single Axis iMEMS® Accelerometer with Analog Input," 1999.
"Vehicles Stability Control Systems," by Jim Kerr, from www.CanadianDriver.com website, 2001.
Delphi Automotive Systems, "Vehicle Stability Enhancement Systems TRAXXAR™," Oct. 1999.
"Stability Control: Get Your Yaw–Yaws Out!" by Scott Memmer, from www.edmunds.com website, Jun. 6, 2001.
"Controlling Your Yaw" by Karl Brauer, from www.edmunds.com website, Jan. 25, 2001.
"Oldsmobile's Intriguing New Precision Control System" by Scott Memmer, from www.edmunds.com website, Jan. 25, 2001.

Primary Examiner—Gertrude A. Jeanglaude
(74) Attorney, Agent, or Firm—Boyle, Fredrickson, Newholm, Stein & Gratz, S.C.

(57) ABSTRACT

A method and apparatus for estimating vehicle yaw rate using a pair of single axis accelerometers that obviate the need for a gyroscope when used to provide a yaw rate estimate to a vehicle stability control system. The accelerometers are longitudinally aligned along an axis with one accelerometer in front of the vehicle center of gravity and one behind it. A method of estimating yaw rate uses a statistical estimating algorithm to process accelerometer inputs and a steer angle from a steer angle sensor on the vehicle.

29 Claims, 14 Drawing Sheets

U.S. PATENT DOCUMENTS

| | | |
|---|---|---|
| 5,927,143 A | 7/1999 | Cho et al. |
| 5,948,028 A | 9/1999 | Raad et al. |
| 6,122,568 A | 9/2000 | Madau et al. |
| 6,138,066 A | 10/2000 | Guo et al. |
| 6,158,274 A | 12/2000 | Guo et al. |
| 6,161,905 A | 12/2000 | Hac et al. |
| 6,192,305 B1 | 2/2001 | Schiffmann |
| 6,205,401 B1 | 3/2001 | Pickhard et al. |
| 6,282,479 B1 | 8/2001 | Ghoneim et al. |
| 2002/0066317 A1 | 6/2002 | Lin |
| 2002/0109402 A1 | 8/2002 | Nakamura |
| 2002/0153770 A1 | 10/2002 | Matsuno et al. |
| 2002/0161505 A1 | 10/2002 | Reich et al. |
| 2002/0169577 A1 | 11/2002 | Mattes et al. |

* cited by examiner

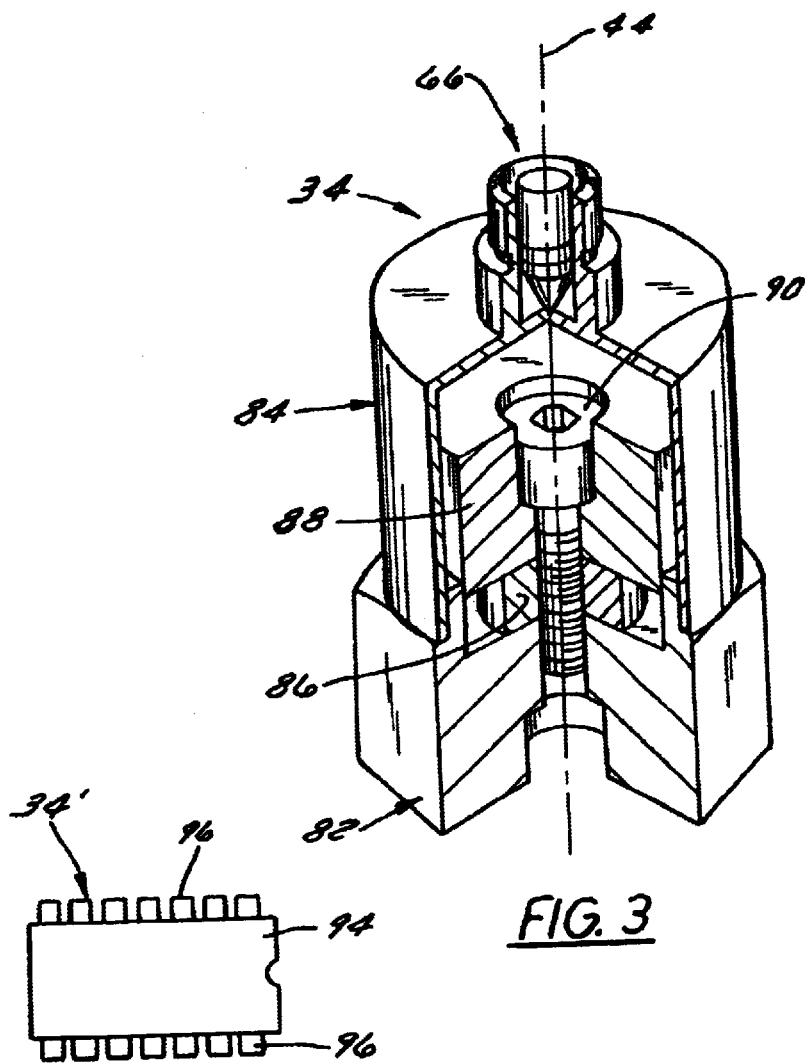
FIG. 3
FIG. 4
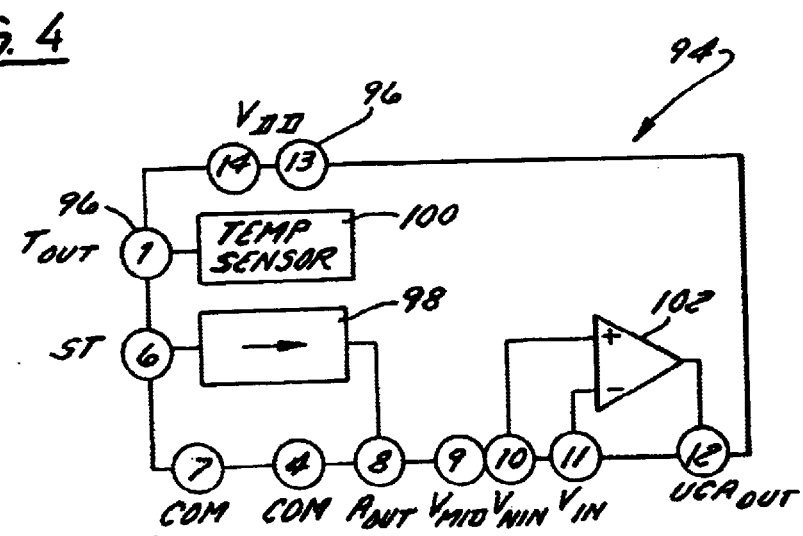
FIG. 5

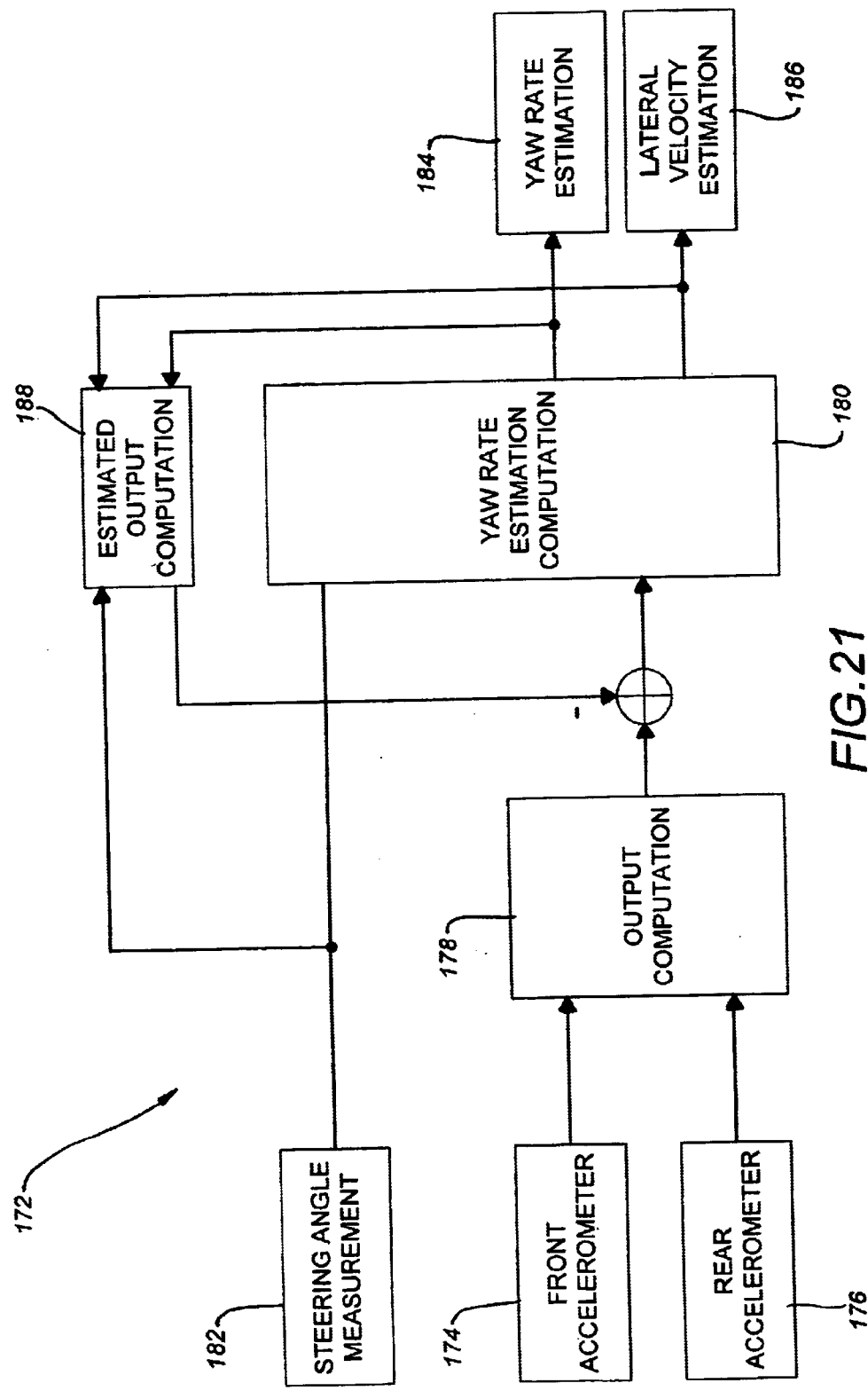

METHOD AND APPARATUS FOR ESTIMATING YAW RATE IN A WHEELED VEHICLE AND STABILITY SYSTEM

CROSS REFERENCE TO RELATED APPLICATION

This application claims priority under 35 U.S.C. Section 119(e) to U.S. Provisional Application Ser. No. 60/313,716, filed Aug. 20, 2001, the entirety of which is hereby expressly incorporated herein by reference.

FIELD OF THE INVENTION

The present invention relates to a method and apparatus for estimating yaw rate in a wheeled vehicle and more particularly to a method and apparatus that is capable of producing an estimate of yaw rate that can be used in a vehicle stability system.

BACKGROUND OF THE INVENTION

Gyroscopes are commonly used to provide an estimate of a rate of rotation about a particular axis. In wheeled vehicle applications, a gyro can be used to help guide and navigate a wheeled vehicle. In other wheeled vehicle applications, a single-axis gyro is typically used to feed an estimate of yaw rate to a stability control system that is capable of making adjustments to vehicle operation that help increase vehicle stability under a wide variety of operating conditions.

Vehicle stability control systems commonly include a computer that executes an algorithm that monitors vehicle operation. Usually, several sensors and engine operation is monitored. If the algorithm determines that the vehicle is unstable or is in danger of becoming unstable, vehicle operation is adjusted in a manner intended to increase stability. Usually, vehicle operation is adjusted by applying one or more brakes. Engine speed can also be controlled.

Sensors that are typically monitored include one or more wheel speed sensors, a steering angle sensor, a yaw rate sensor, and a lateral acceleration sensor. During vehicle operation, signals from one or more of these sensors are used to determine an acceptable yaw rate threshold given the speed of the vehicle, its lateral acceleration, and its steer angle. If the actual yaw rate provided from the yaw rate sensor exceeds the acceptable yaw rate threshold, vehicle stability control is initiated.

For example, in at least one stability control system, where a condition known as understeer is detected, the front inside brake is selectively applied. Where oversteer is detected, the outside front brake is selectively applied. Where the vehicle is slipping sideways and sideslip is detected, at least one vehicle stability control system selectively applies at least one brake to increase stability. The amount of power assist applied to the power steering system can also be regulated to help prevent instability during sideslip.

The yaw rate sensor typically is a single-axis gyro and the lateral acceleration sensor typically is an accelerometer. One type of gyro that is commonly used in stability control systems is a fiber optic rate gyro. Other types of gyros can also be used.

However, the gyro makes up a significant portion of the cost of these systems. As a result, use of vehicle control stability systems has generally been limited to more expensive luxury cars. Thus, it is desired to find a more economical solution to obtain yaw rate. It is also desired to produce a less costly vehicle stability control system.

SUMMARY OF THE INVENTION

The present invention is directed to an apparatus and method of obtaining estimated yaw rate that can be used as an input into a vehicle stability control system or the like for a wheeled land vehicle. The apparatus includes a pair of longitudinally spaced single axis accelerometers with one of the accelerometers being located in front of a center of gravity of a vehicle and the other one of the accelerometers being located behind the center of gravity. The accelerometers lie along a common axis that preferably is aligned with a vehicle centerline. Preferably, the accelerometer axis overlies the vehicle centerline and can be coincident with it.

The accelerometer outputs are processed by a processor to obtain lateral accelerations that are used as inputs along with steer angle from a steering angle sensor to obtain a yaw rate estimate. The yaw rate estimate preferably is then used as an input to a vehicle stability control system, such as a control system that regulates wheel speed and/or engine speed to increase vehicle stability should the estimated yaw rate fall outside of a desired threshold.

In a method of estimating yaw rate, the lateral accelerations and steer angle are inputted into a statistical estimating algorithm that preferably is recursive to obtain an estimate of yaw rate and lateral vehicle velocity. One or both estimates can then be used as inputs into a vehicle stability control system.

Thereafter, a current steering angle along with the prior estimated yaw rate and lateral velocity are processed to provide a correction to the next input from which the next iteration of estimated yaw rate and lateral velocity are determined. The suit is a method of determining an estimated yaw rate that is fast, simple, and which is noise tolerant and relatively immune to vehicle tilt and roll.

Other objects, features, and advantages of the present invention will become apparent to those skilled in the art from the detailed description and the accompanying drawings. It should be understood, however, that the detailed description and accompanying drawings, while indicating at least one preferred embodiment of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout and in which:

FIG. 3 is a preferred example of an accelerometer;

FIGS. 4 and 5 depict another preferred embodiment of an accelerometer suitable for use in the invention;

FIG. 21 is a flowchart illustrating a preferred method of producing a yaw rate estimate.

DETAILED DESCRIPTION OF AT LEAST ONE PREFERRED EMBODIMENT

Figure 1:
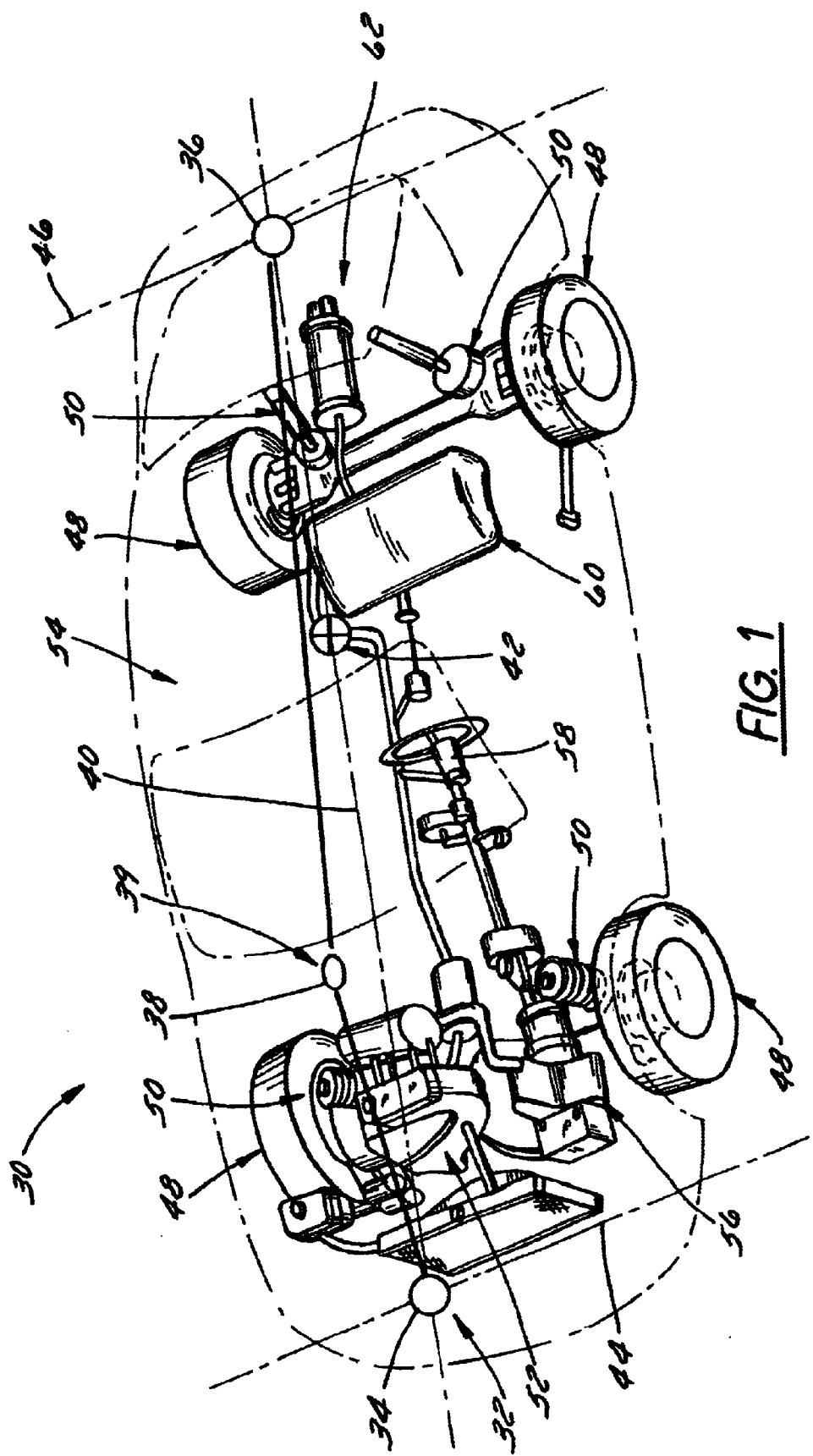
FIG. 1 depicts a wheeled land vehicle equipped with a yaw rate sensor arrangement of the invention.

FIG. 1 illustrates a wheeled land vehicle 30 that includes a yaw rate estimating arrangement 32 that includes a plurality of sensors 34, 36 that are spaced apart and disposed in the vehicle 30 and arranged in a manner that enables their output to be processed by an on board processor 38 to provide an estimate of yaw rate. In a preferred embodiment, the sensors 34, 36 and the processor 38 comprise part of a vehicle stability control system 39 that is used to make adjustments to vehicle operation based on estimated yaw rate to help increase vehicle stability. In a preferred embodiment, both sensors are single axis accelerometers 34, 36 disposed along a common longitudinal axis 40 with one accelerometer 34 being disposed forwardly of a center of mass 42 of the vehicle 30 and the other accelerometer 36 being disposed rearwardly thereof.

Each accelerometer 34, 36 is oriented such that its sensitive axis or sensing axis is oriented transversely and generally perpendicular relative to the longitudinal vehicle axis 40. In a preferred orientation that is depicted in FIG. 1, the front accelerometer 34 has a sensing axis 44 that is oriented generally parallel relative to the front axle of the vehicle and the rear accelerometer 34 has a sensing axis 46 that is oriented generally parallel relative to the rear axle of the vehicle.

The wheeled land vehicle 30 has a chassis that carries wheels 48. Each wheel 48 preferably is supported by a suspension arrangement 50 that can include a shock, a strut or the like. The vehicle 30 is equipped with a drive 52 that rotatively drives at least one of the wheels 48 to propel the vehicle. While the drive 52 can include an internal combustion engine, such as is depicted in FIG. 1, it is contemplated that the yaw rate sensor arrangement 32 and method of estimating yaw rate of this invention can also be used in vehicles equipped with an electric powered drive, a hybrid powered drive, a fuel cell powered drive, or another type of drive arrangement. The drive 52 preferably also includes a powertrain, where one is needed.

The vehicle 30 has a passenger compartment 54 in which a plurality of passengers (not shown) can sit and a steering assembly 56 that includes a steering direction control 58. In the presently contemplated preferred wheeled vehicle embodiment, the steering direction control 58 comprises a steering wheel. Fuel storage 60 and an exhaust system 62 are also provided.

The wheeled land vehicle 30 preferably is an automotive vehicle, such as the automobile shown in FIG. 1. If desired, the vehicle 30 can be a truck, a tractor, or another type of wheeled land vehicle that is equipped with wheels that support the vehicle on the ground. Such a vehicle can be an off road vehicle or a vehicle that is capable of off road use.

Figure 2:
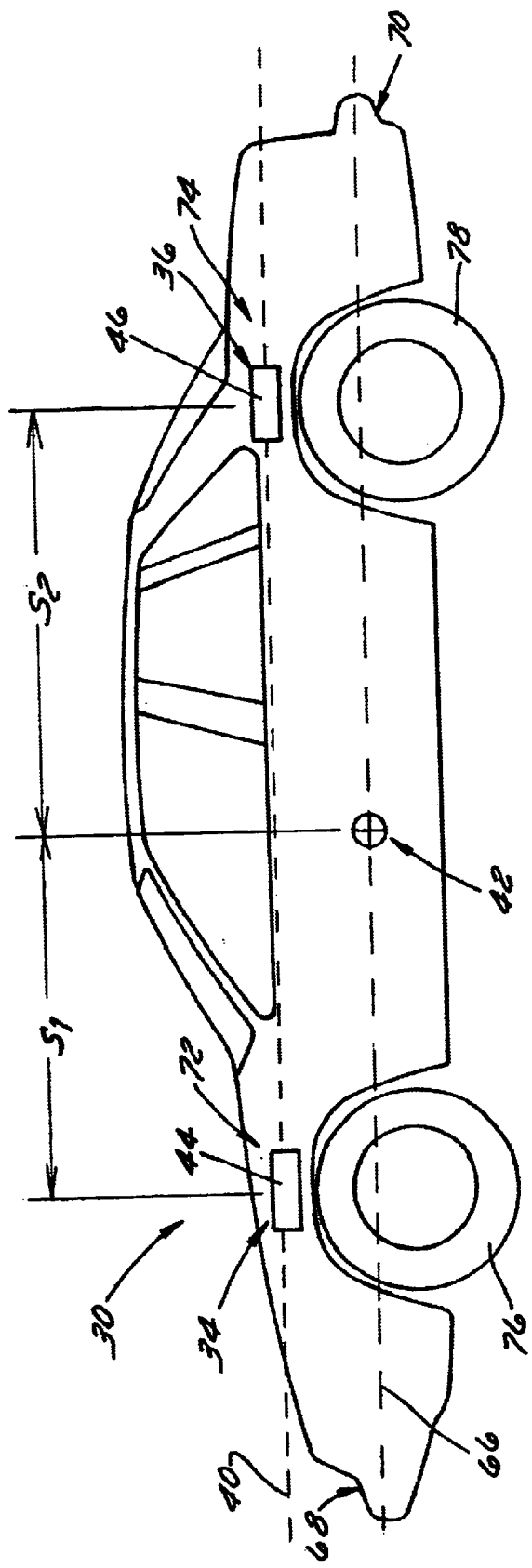
FIG. 2 is a side view of a wheeled land vehicle depicting a second preferred yaw rate sensor arrangement orientation.

In a currently preferred embodiment, both accelerometers 34, 36 are disposed along a longitudinally extending axis 40 with the axis preferably extending through the center of mass 42 of the vehicle 30. An example of such an arrangement is shown in FIG. 1. Referring to FIG. 2, in another preferred embodiment, the accelerometer placement axis 40 is offset a distance from the vehicle center of mass 42. Where offset, the axis 36 preferably is parallel to the vehicle centerline 66, which is a longitudinal axis that extends through the center of mass 38. While the accelerometer placement axis 40 is shown vertically offset from the center of mass 38 and vehicle centerline 66, the axis 40 can be transversely offset such that it is disposed between the vehicle centerline 66 and the wheels along one side of the vehicle.

An advantage of using a pair of accelerometers 34, 36 to estimate yaw rate is that the sensors can be more flexibly located. More specifically, the accelerometers 34, 36 can be located anywhere along a longitudinally extending axis. For example, the accelerometers 34, 36 can be located adjacent or inboard the vehicle bumpers 68, 70 or in or adjacent vehicle wheel wells 72, 74. For example, FIG. 1 depicts an embodiment where one accelerometer 34 is disposed inboard of the front vehicle bumper and the other accelerometer 36 is disposed inboard of the rear vehicle bumper. FIG. 2 illustrates an embodiment where one accelerometer 34 is disposed in a front wheel well 72 adjacent a front vehicle wheel 76 and the other accelerometer 36 is disposed in a rear wheel well 74 adjacent a rear wheel 78.

Referring to FIG. 2, while the accelerometers 34, 36 can be spaced equidistantly apart relative to the center of mass 38, the front accelerometer 32 is spaced a distance, $S_1$, from the center of mass 38 that is not equal to the distance, $S_2$, that the rear accelerometer 34 is spaced from the center of mass 38. The distances, $S_1$ and $S_2$, are ascertained for use in estimating yaw rate. As is depicted in FIG. 2, $S_1$ is less than $S_2$.

In one preferred arrangement, such as is depicted in FIG. 1, the accelerometers 34, 36 are disposed along an axis 40 that is the centerline of the wheeled land vehicle 30. Preferably, the axis 40 passes directly through the center of mass 42 of the vehicle.

FIG. 3 illustrates an example of a preferred embodiment of an accelerometer 34. The accelerometer 34 shown in FIG. 3 is a solid-state accelerometer. The accelerometer 34 has a base 82 that carries a housing 84. A crystal 86 is disposed within the housing 84 between a mass 88 and the base 82. A fastener 90 anchors the mass 88 and crystal 86 to the base 82. The crystal 86 preferably is piezoelectric and can be comprised of quartz. Electrical leads 92 are attached to the crystal 86 so as to enable signals to be outputted from the accelerometer 34 for processing. Other types of accelerometers can be used.

FIGS. 4 and 5 illustrate a preferred embodiment of an accelerometer 34' that is of solid-state construction and comprises an integrated circuit 94 (IC). The IC 94 has a plurality of pairs of pins 96 that are received in a circuit board (not shown) in an accelerator module that is mounted to the vehicle 30 in the manner depicted in FIGS. 1 and 2. Referring more particularly to FIG. 5, the accelerometer IC 94 includes an onboard single axis sensor 98 and preferably also includes an onboard temperature sensor 100 used to provide temperature compensation. If desired, the IC 94 can also be equipped with an onboard amplifier 102 that can be used to change the scale factor of the single axis sensor 98. External resistors, capacitors, and other electrical components can be attached as needed to one or more of the pins 96 of the chip 94 to increase scale factor, amplify sensor output, provide filtration, and/or reduce noise in a manner known to those skilled in the art. After the output signal from the sensor 96 has been processed, such as by using one or more of these off board electrical components, the sensor output signal preferably is converted into a digital signal using an analog-to-digital converter.

On preferred accelerometer 34' well suited for use is an integrated circuit accelerometer marketed under the model number ADXL105 by Analog Devices of One Technology Way, Norwood, Mass. The ADXL105 accelerometer integrated circuit 94 includes a high accuracy single axis accelerometer 98 equipped with an onboard temperature sensor 100 and an operational amplifier 102. The ADXL105 is a microelectromechanical system (MEMS) device having a high accuracy of between ±1 g and ±5 g, possesses a resolution of 2 mg, has a bandwidth of about ten kilohertz, and has a generally flat amplitude response ($\approx \pm 1\%$) to about five kilohertz. The ADXL105 is a monolithic integrated circuit chip that can be obtained in a 14 lead surface mount Cerpak format that is capable of achieving output scale factors that can vary from 250 mV/g to 1.5 V/g, depending upon the use of the onboard amplifier 102 and one or more external resistors. Such a device preferably has a cost of less than five dollars and typically between two dollars and five dollars, depending upon quantity. In one preferred embodiment, each device 34 or 34' costs less than two dollars.

Figure 6:
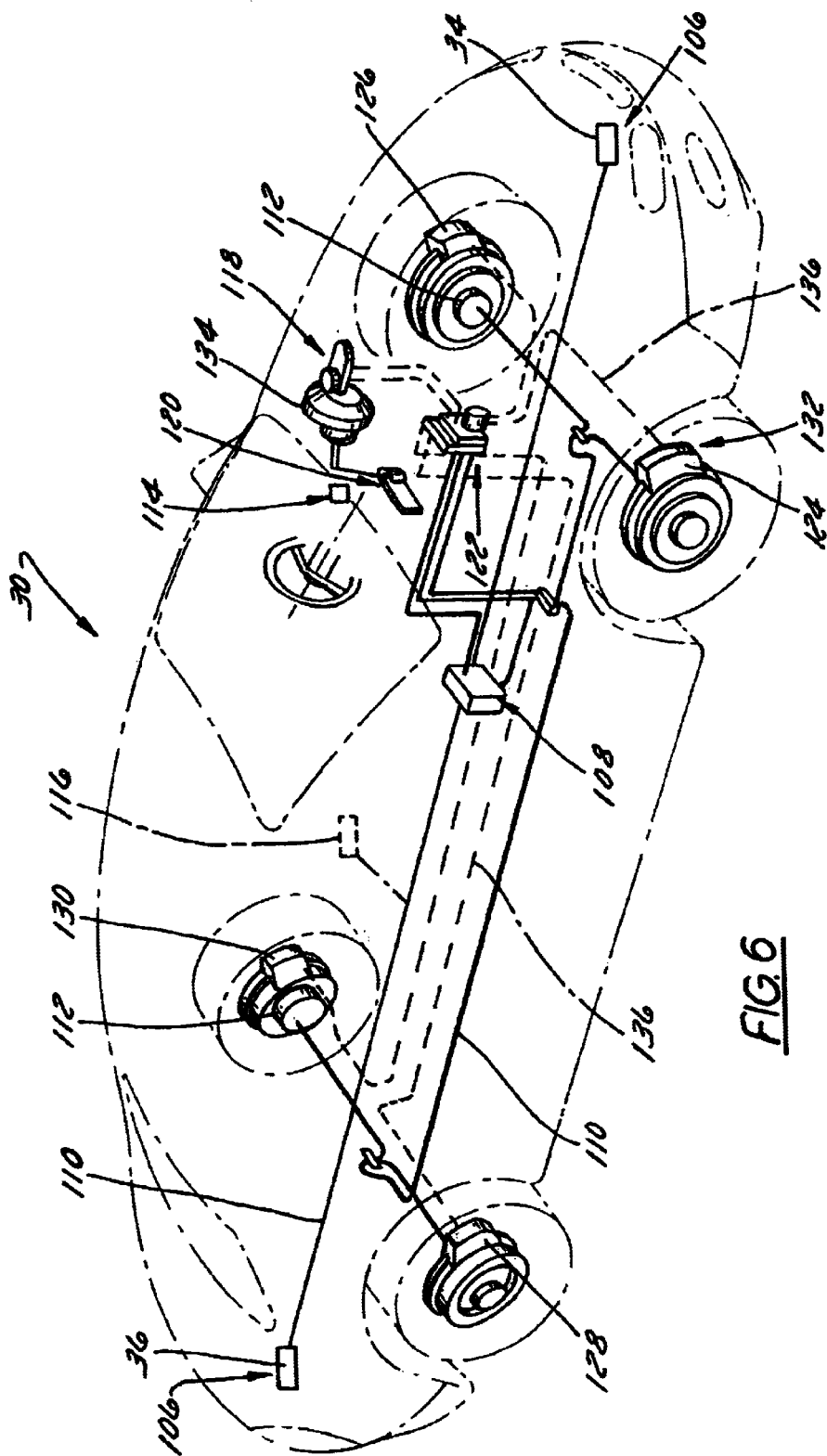
FIG. 6 is a perspective view of a wheeled land vehicle equipped with a yaw rate sensor arrangement that provides a yaw rate estimate to a vehicle stability control system.

FIG. 6 illustrates an example of a vehicle stability control system 104 for a wheeled land vehicle 30 (shown in phantom) using a yaw rate sensor arrangement 106 and method of this invention. The wheeled land vehicle 104 preferably is an automobile.

The vehicle stability control system 104 includes a processor 108, such as a microcomputer, a microprocessor, or the like. The processor 108 communicates by wire or wireless links 110 with a plurality of sensors. For example, the processor 104 communicates with a plurality of wheel speed sensors 112, sensors 34, 36 of the yaw rate sensor arrangement 106, and a steer angle sensor 114. If desired, the processor 108 can communicate with other sensors and devices. In the exemplary system depicted in FIG. 6, there is a wheel speed sensor 112 for each vehicle wheel, a pair of sensors 34, 36 used to estimate yaw rate, a lateral acceleration sensor 116, a single steer angle sensor 114, and a braking sensor 118. Only two wheel speed sensors 112 are shown in FIG. 6. In a currently preferred embodiment, one of the accelerometer sensors 34, 36 also functions as the lateral acceleration sensor thereby eliminating the need for an additional accelerometer.

Other arrangements are possible. For example, the yaw rate sensor arrangement 106 can be incorporated into other vehicle stability control systems, such as those disclosed in U.S. Pat. Nos. 5,446,657, 6,053,583, 6,205,375, 6,263,261, and 6,438,483, the disclosures of each of which are expressly incorporated by reference herein.

The processor 108 communicates with each accelerometer 34, 36 of the yaw rate sensor arrangement 106 as well as with the lateral acceleration sensor. The processor 108 communicates with these sensors to obtain information from them that is used in determining whether vehicle stability criteria is being met. In one preferred embodiment, one of the accelerometers 34, 36 does dual duty as the lateral acceleration sensor. In another embodiment, the lateral accelerometer sensor is a separate device. The processor 108 also communicates with the steer angle sensor 114 and can also communicate with other sensors. For example, the processor 108 can communicate with brake switch(es) and sensor(s) 118, brake pedal sensor(s) 120, pressure sensor(s), such as for sensing brake fluid pressure or tire pressure (not shown), and one or more other sensors (not shown) of the steering system to receive data relating to vehicle operation from them.

If desired, a different or separate processor (not shown) can be used to process signals from the accelerometers 34, 36 of the yaw rate sensor arrangement 106 to obtain a yaw rate estimate that is then fed to processor 108. In at least one preferred embodiment, processor 108 executes firmware or software to obtain a yaw rate estimate directly from the signals from the accelerometers 34, 36. In one preferred implementation, the processor 108 is configured to determine a yaw rate estimate using signals or data from the accelerometers 34, 36 and the steer angle sensor 114. The processor 108 preferably is also configured with a statistical estimating algorithm that preferably is a Lewenberg filter or a Kalman filter that accepts input from the accelerometers 34, 36 and steer angle sensor 114. The filter is used in determining a yaw rate estimate while helping to null or reduce yaw rate estimation error. The processor 108 is configured to use the estimated yaw rate to help increase vehicle stability when necessary.

During operation of the preferred embodiment of the vehicle stability control system shown in FIG. 6, the processor 108 communicates control signals to a controller 122 depending upon the value of the yaw rate estimate obtained. The controller 122 preferably comprises a modulator that selectively applies one or more brakes 124, 126, 128, 130 of a brake system 132 of the vehicle 30 depending upon the received control signals. Where the brake system 132 is a hydraulic brake system, the modulator 122 selectively causes hydraulic pressure, such as via master cylinder 134, to increase in one or more hydraulic lines 136 (shown in phantom) to cause one or more of the brakes 124, 126, 128, 130 to engage. In this manner, one or more wheels of the vehicle 30 can be slowed to help increase stability. The processor 108 can also communicate control signals to the engine or an electronic engine controller (not shown) onboard the vehicle 30 that can regulate engine speed, typically by slowing it down, to help increase stability.

While all four wheels are shown in FIG. 6 equipped with disc brakes, drum brakes can be used on one or more of the wheels. While a hydraulic braking system is shown in FIG. 6, an electric braking system also can be used. Depending upon the type of braking system, only the front brakes 124, 126 or only the rear brakes 128, 130 may be selectively engageable by the processor 108 when it initiates vehicle stability control. For example, where only the front brakes 128, 130 are selectively engageable, the processor 108 can cause one or both front brakes 128, 130 to selectively engage when vehicle stability control is initiated. If the braking system comprises an antilock braking system (ABS) and/or a traction control system, the processor 108 can interface with the system, such as by being linked to a controller of the system.

Yaw rate measurement information is necessary for vehicle stability control systems, such as the system 104 shown in FIG. 6, as well as for other vehicle control applications. Typically, rate gyros (not shown) have been used in the past to measure the yaw rate. However, the cost of rate gyros is more expensive compared to other sensors, such as accelerometers. Yaw rate measurement can significantly improve the performance of a lateral motion control system for intelligent vehicles. As a lower cost alternative to using a yaw rate gyro, the present invention is directed to a method and apparatus that uses a plurality of single axis accelerometers 34, 36 in estimating yaw rate.

The present invention advantageously eliminates the use of rate gyros by utilizing one single axis accelerometer 34 in tandem with a second single axis accelerometer 36 from which both yaw rate and lateral acceleration is obtained. As a result, vehicle stability control system component costs are reduced while performance and reliability remain uncompromised.

A method of processing data from the accelerometers 34, 36 compensates for vehicle tilt effects by installing the accelerometers 34, 36 longitudinally. Using lateral acceleration measurements obtained from each sensor 34 and 36, the rate of change of the yaw rate can be found. Then, using this information, an estimate of yaw rate and slip velocity can be obtained using a state estimation algorithm.

Figure 7:
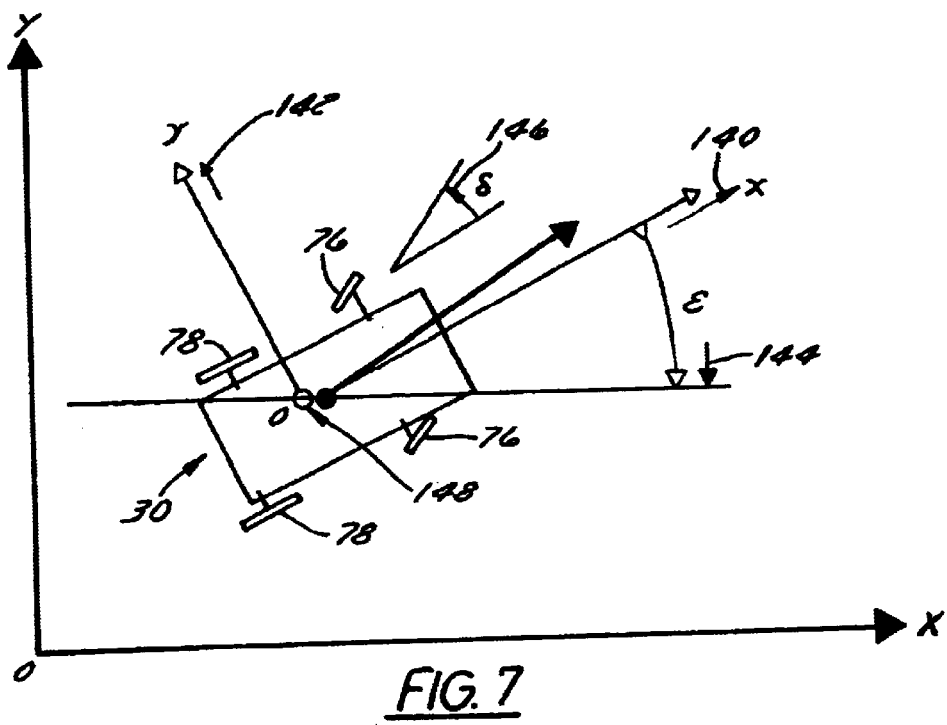
FIG. 7 depicts a vehicle to illustrate a bicycle model used in deriving a method of estimating a yaw rate.

Referring to FIG. 7, a present implementation of the method assumes use of a bicycle model for the vehicle 30. The bicycle model represents vehicle motions in a horizontal plane. It is obtained by lumping the two front wheels 76 into one imaginary front wheel and the two rear wheels 78 into one imaginary rear wheel. In addition, suspension dynamics are neglected. Thus, roll, pitch, and heave motions are not included.

FIG. 7 presents variables used to describe the dynamics and coordinates used for equation motion derivation. If it is assumed that the longitudinal speed ($V_x$) of the vehicle 30 is constant, the equations of motion using the axes fixed to the vehicle (oxy), as they relate to vehicle origin, o, 148, can be written as follows:

$$m(\dot{V}_y + V_x\dot{\epsilon}) = f_f \cos\delta + f_r \quad \text{(Equation I)}$$

$$I_z\ddot{\epsilon} = l_1 f_f \cos\delta - l_2 f_r \quad \text{(Equation II)}$$

In the above equations, $V_x$ denotes the component of the speed of the vehicle 30 in the direction of ox axis, as indicated by arrowhead 140, and $V_y$ denotes the component of the vehicle speed in the direction of oy axis, as indicated by arrowhead 142. The overall velocity, V, of the vehicle 30 is obtained from $V_x$ and $V_y$. The variable, $\epsilon$, denotes the yaw angle with respect to the absolute coordinates, OXY, and the variable, $\delta$, represents the steering angle of the vehicle 30. The direction of the yaw angle, $\epsilon$, is indicated by arrowhead 144 and the direction of steer is indicated by arrowhead 146. Other symbols and their nominal values are listed in Table 1 below. The variables, $f_f$ and $f_r$, denote the side forces for the front tire and the rear tire, respectively, of the vehicle under the bicycle model.

TABLE 1

| | |
|---|---|
| $\delta$ | Front steering wheel angle |
| $\epsilon$ | Yaw angle of the vehicle |
| $V_x$ | Longitudinal velocity of the vehicle |
| $V_y$ | Lateral velocity of the vehicle |
| $C_s$ | Cornering stiffness |
| M | Mass of the vehicle |
| $I_z$ | Moment of inertia of the vehicle |
| $l_1$ | Distance from the center of gravity to front axle |
| $l_2$ | Distance from center of gravity to rear axle |

Table 1 lists the variables and parameters depicted in FIGS. 7–9 and presented in equations set forth above and below. These variables and parameters also correspond to the bicycle model used to model the vehicle 30 shown in FIGS. 7–9. It is noted that the side force for each tire is a function of tire sideslip angle. The slip angle is defined as the angle between the direction of an object and the velocity vector of the object. If the object is a tire, the tire sideslip angle, $\alpha$, can be obtained as follows:

$$\alpha_f = \delta - \frac{l_1\dot{\epsilon} + V_y}{V_x} \quad \text{(Equation III)}$$

$$\alpha_r = \frac{l_2\dot{\epsilon} - V_y}{V_x} \quad \text{(Equation IV)}$$

Here, $\alpha_f$ and $\alpha_r$ represent the front and the rear tire sideslip angle, respectively. If it is assumed that the tire sideslip angles are small, the side forces can be defined as:

$$f_f = 2C_s\alpha_f \quad \text{(Equation V)}$$

$$f_r = 2C_s\alpha_r \quad \text{(Equation VI)}$$

Using the simplified tire model, the bicycle model equations of motion can be written as follows:

$$\dot{V}_y = a_1 V_y + a_2 r + b_1 \delta \quad \text{(Equation VII)}$$

$$\dot{r} = a_3 V_y + a_4 r + b_2 \delta \quad \text{(Equation VIII)}$$

Here, the variable, r, denotes the yaw rate of the vehicle 30, i.e., r=$\dot{\epsilon}$, and the variable, $\dot{r}$, denotes the rate of change of the yaw rate. The coefficients of Equations VII and VIII above are defined as follows:

$$a_1 = -\frac{4C_s}{mV_x} \quad \text{(Equation IX)}$$

$$a_2 = -2C_s\frac{l_1 - l_2}{mV_x} - V_s \quad \text{(Equation X)}$$

$$a_3 = -2C_s\frac{l_1 - l_2}{I_zV_x} \quad \text{(Equation XI)}$$

$$a_4 = -2C_s\frac{l_1^2 + l_2^2}{I_zV_x} \quad \text{(Equation XII)}$$

$$b_1 = 2\frac{C_s}{m} \quad \text{(Equation XIII)}$$

$$b_2 = 2l_1\frac{C_s}{I_z} \quad \text{(Equation XIV)}$$

Referring once again to FIG. 2, the yaw rate, r, is estimated by measuring accelerations at two different locations on the vehicle 30. Two single-axis accelerometers 34, 36 are used to provide data from which such accelerations can be obtained. The accelerometers 34, 36, lay along an axis 40 that is parallel to and overlies the vehicle centerline 66. One of the accelerometers 34, i.e., the front accelerometer, is installed in front of the center of gravity 42 of the vehicle 30 and the other accelerometer 36, i.e., the rear accelerometer, is installed behind the center of gravity 42, such as in the manner depicted in FIG. 2.

The distance between the front accelerometer 34 and the center of gravity 42 is denoted as $S_1$ in FIG. 2, and the distance between the rear accelerometer 36 and the center of gravity 42 is denoted as $S_2$. The choice of $S_1$ and $S_2$ can be arbitrary, but should not be zero.

The acceleration, $a_{yf}$, measured using the front accelerometer 34 can be modeled as follows:

$$a_{yf} = \dot{V}_y + V_x r + S_1 \dot{r} \quad \text{(Equation XV)}$$

Also, the acceleration, $a_{yr}$, measured by the rear accelerometer 36 can be modeled as follows:

$$a_{yr} = \dot{V}_y + V_x r - S_2 \dot{r} \quad \text{(Equation XVI)}$$

By subtracting Equation XV from equation XVI, the following equation can be obtained:

$$\dot{r} = \frac{a_{yf} - a_{yr}}{S_1 + S_2} \quad \text{(Equation XVII)}$$

By taking Equation XVII as the output of the system representing the lateral dynamics, i.e., represented by Equations VII and VIII above, an observer can be implemented as follows. Suppose that the output of the system represented by Equations VII and VIII is chosen as:

$$Y = \frac{a_{yf} - a_{yr}}{S_1 + S_2} \quad \text{(Equation XVIII)}$$

The system is therefore observable for any nonzero vehicle speed and for any cornering stiffness, $C_s$, when the weight distribution ratio of the vehicle 30 between its front wheels 76 and rear wheels 78 is not 50:50.

Recalling Equations VIII and XVII, Equation XVIII can be modified as follows:

$$Y = a_3 V_y + a_4 r + b_2 \delta \quad \text{(Equation XIX)}$$

As a result, an observability matrix can be defined as:

$$O = \begin{bmatrix} a_3 & a_4 \\ a_3 a_1 + a_4 a_3 & a_3 a_2 + a_4^2 \end{bmatrix} \quad \text{(Equation XX)}$$

Now, for the range of the velocity of the vehicle and the range of the cornering stiffness value, determinant of the observability matrix becomes nonzero:

$$\det(O) = a_3^2 a_2 + a_3 a_4^2 - a_3 a_4 a_1 - a_3 a_4^2 \quad \text{(Equation XXI)}$$
$$= a_3(a_2 a_3 - a_4 a_1) \neq 0$$

Once again, this assumes that the weight distribution ratio is not 50:50. Note that if the weight distribution ratio is 50:50, $a_3$ becomes 0. Therefore, the system is observable.

Suppose that a state observer for the system represented by Equations VII and VIII using the output obtained as Equation XIX is constructed as:

$$\dot{\hat{V}}_y = a_1 \hat{V}_y + a_2 \hat{r} + b_1 \delta + L_1(Y - \hat{Y}) \quad \text{(Equation XXII)}$$

$$\dot{\hat{r}} = a_3 \hat{V}_y + a_4 \hat{r} + b_2 \delta + L_2(Y - \hat{Y}) \quad \text{(Equation XXIII)}$$

where:

$$\hat{Y} = a_3 \hat{V}_y + a_4 \hat{r} + b_2 \delta. \quad \text{(Equation XXIV)}$$

Then, estimation errors, $V_y - \hat{V}_y$ and $r - \hat{r}$, converge to zero with proper choice of $L_1$ and $L_2$. By subtracting Equation XXII from Equation VII and taking into consideration Equations XIX and XXIV, the error dynamics of the lateral velocity estimation can be written as:

$$\dot{\tilde{V}}_y = a_1 \tilde{V}_y + a_2 \tilde{r} - L_1(a_3 \tilde{V}_y + a_4 \tilde{r}) \quad \text{(Equation XXV)}$$

Here, $\tilde{V}_y = V_y - \hat{V}_y$ and $\tilde{r} = r - \hat{r}$. Similarly, the error dynamics of the yaw rate estimation can be written as:

$$\dot{\tilde{r}} = a_3 \tilde{V}_y + a_4 \tilde{r} - L_2(a_3 \tilde{V}_y + a_4 \tilde{r}). \quad \text{(Equation XXVI)}$$

Equations XXV and XXVI can be written in matrix form as follows:

$$\begin{bmatrix} \dot{\tilde{V}} \\ \dot{\tilde{r}} \end{bmatrix} = \Phi \begin{bmatrix} \tilde{V} \\ \tilde{r} \end{bmatrix} \quad \text{(Equation XXVII)}$$

Here, $$\Phi = \begin{bmatrix} a_1 - L_1 a_3 & a_2 - L_1 a_4 \\ a_3 - L_2 a_3 & a_4 - L_2 a_4 \end{bmatrix} \quad \text{(Equation XXVIII)}$$

Now, the characteristic equation of $\Phi$ can be found as follows:

$$s^2 - (a_1 - L_1 a_3 + a_4 - L_2 a_4)s + (a_1 a_4 - a_3 a_4)(1 - L_2) = 0 \quad \text{(Equation XXIX)}$$

Now consider the following equation whose solutions are denoted as $\lambda_1$ and $\lambda_2$. Assume that the real parts of $\lambda_1$ and $\lambda_2$ are negative:

$$s^2 - (\lambda_1 + \lambda_2)s + \lambda_1 \lambda_2 = 0 \quad \text{(Equation XXX)}$$

Now set the coefficients of Equation XXIX to Equation XXX. Then, the following equation is obtained:

$$\begin{cases} \lambda_1 + \lambda_2 = a_1 - L_1 a_3 + a_4 - L_2 a_4 \\ \lambda_1 \lambda_2 = (a_1 a_4 - a_3 a_4)(1 - L_2) \end{cases} \quad \text{(Equation XXXI)}$$

By solving Equation XXXI, $L_1$ and $L_2$ can be found and the eigenvalues of $\Phi$ will have negative real part. Therefore, the estimation errors converge to zero. It should be noted that, for the observer, the steering angle must to be measured. This method used to find $L_1$ and $L_2$ is referred to as a pole placement method.

The preferred algorithm was developed by ignoring roll and super-elevation. However, the effect of the roll and the super-elevation can be analytically predicted and shown that it can be safely ignored. Effectively, the roll angle and the super-elevation angle that a vehicle 30 is likely to encounter can be represented as a lateral tilting angle of the sprung mass of the vehicle 30 depicted in FIGS. 8 and 9.

Figure 8:
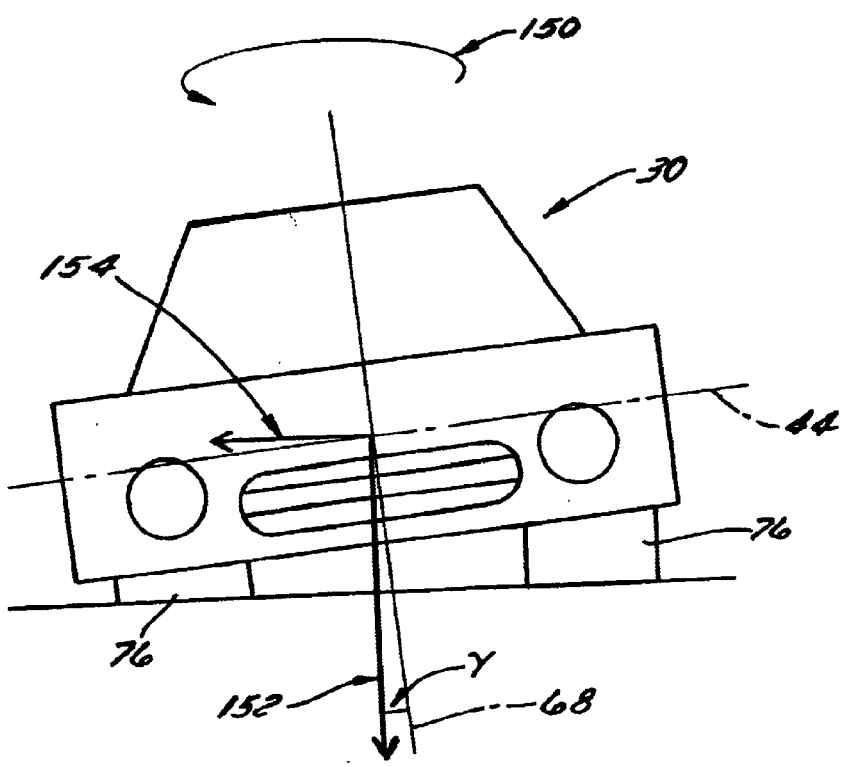
FIG. 8 illustrates a vehicle being subjected to tilt due to body roll.

Vehicle tilt, such as what can occur when a vehicle 30 is turning, is depicted in FIG. 8. No matter what the cause, suppose that the vehicle shown in FIG. 8 experiences a rolling motion in the direction indicated by arrow 150 that causes the vehicle 30 to tilt such that its centerline 68 is disposed at angle, γ, relative to the force of gravity 152 acting on the vehicle 30. The direction of the lateral acceleration 154 of the vehicle 30 makes the same angle with the direction of the accelerometer measurement 44 as the tilt angle, γ.

Figure 9:
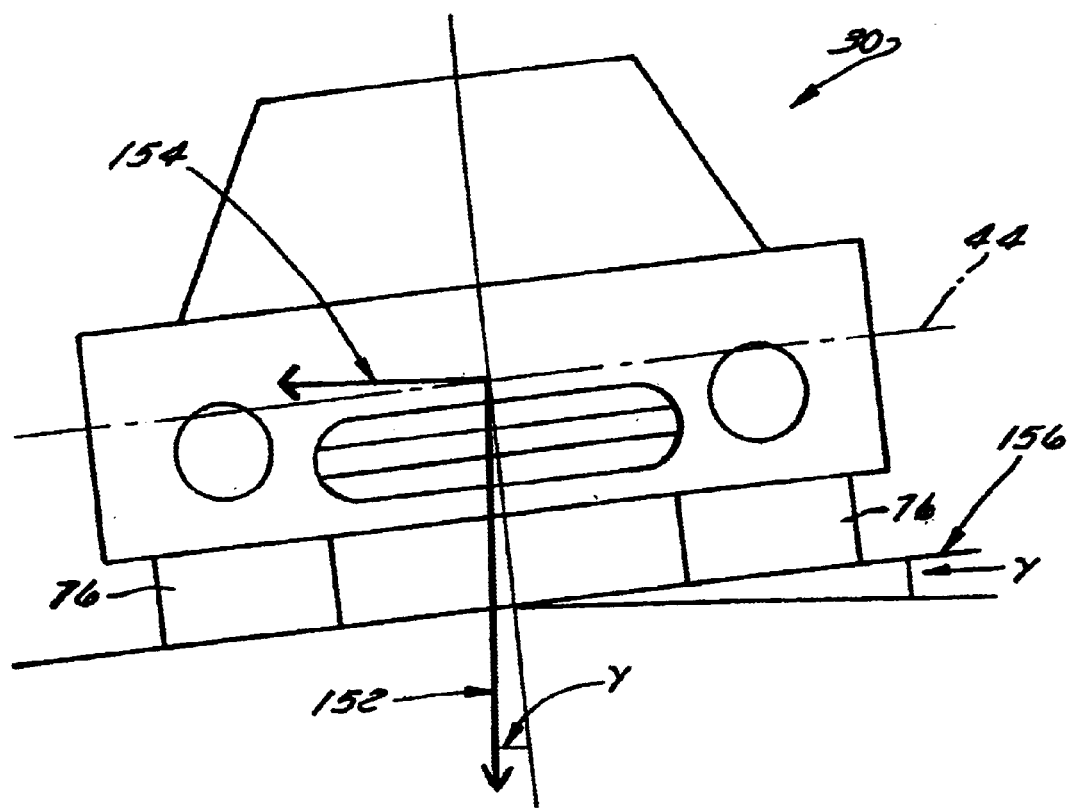
FIG. 9 illustrates a vehicle being subjected to tilt due to an inclined surface upon which the vehicle is traveling.

Now consider vehicle tilt caused by super-elevation such as can be caused by the banked roadway 156 depicted in FIG. 9. In this drawing figure, the angle of the super-elevation is denoted as γ. This angle, γ, also corresponds to the angle between the force of gravity 152 acting on the vehicle 30 and the centerline 68 of the vehicle. Again, the direction of the lateral acceleration 154 and a direction of the axis 44 of measurement of the accelerometer 34 make the same angle with the super-elevation angle. Therefore, for both cases, the acceleration measurement can be presented as follows:

$$(a_y)_{measured} = a_y \cos \gamma + g \sin \gamma \quad \text{(Equation XXXII)}$$

Here, $a_y$ is the lateral acceleration of the vehicle 30, which is presented as either Equation XV or Equation XVI, and γ is the angle of the tilt that is generated by vehicle roll motion or super-elevation. The variable, $(a_y)_{measured}$, is the measured acceleration from the accelerometer.

If the vehicle tilts angle, γ, expressed in radians, and γ=o(1), the measured rate change of yaw rate obtained using Equation XVII or Equation XVIII will have relative error on the order of $\gamma^2$. When the vehicle 30 tilts, the measured accelerations from Equations XV and XVI become as follows:

$$(a_{yf})_{measured} = (\dot{V}_y + V_x r + S_1 \dot{r}) \cos \gamma + g \sin \gamma \quad \text{(Equation XXXIII)}$$

$$(a_{yr})_{measured} = (\dot{V}_y + V_x r - S_2 \dot{r}) \cos \gamma + g \sin \gamma \quad \text{(Equation XXXIV)}$$

Using these two equations, Equation XVIII becomes:

$$(Y)_{measured} = Y \cos \gamma. \quad \text{(Equation XXXV)}$$

The variable, Y, which is vehicle position along the Y-axis, is defined above in Equation XVIII. The error in Y due to vehicle tilt can be defined as:

$$(Y)_{error} = Y - (Y)_{measured} \quad \text{(Equation XXVI)}$$

Simplifying for small values of, γ, Equation XXVI becomes:

$$(Y)_{error} = Y(1 - \cos \gamma) \quad \text{(Equation XXVII)}$$

Since γ=o(1), a Taylor series of 1−cos γ can be obtained as follows:

$$1 - \cos \gamma = \frac{1}{2}\gamma^2 - \frac{1}{24}\gamma^4 + O(\gamma^6) \quad \text{(Equation XXVIII)}$$

Therefore, the relative error can be represented by either one of the following equations:

$$\frac{(Y)_{error}}{Y} = 1 - \cos \gamma = \frac{1}{2}\gamma^2 - \frac{1}{24}\gamma^4 + O(\gamma^6) \quad \text{(Equation XXIX)}$$

or $$\frac{(Y)_{error}}{Y} = O(\gamma^2) \quad \text{(Equation XXX)}$$

Using the aforementioned equations, where vehicle tilt angle, γ, is 10°, the relative error is $$\frac{1}{2}\left(\frac{10\pi}{180}\right)^2 = 0.0152 = 1.52\%.$$

For 20° of tilt, the relative error is 0.0603 or 6.03%. Therefore, the error due to tilt can be treated as being negligible for reasonable or normal driving conditions.

Figure 10:
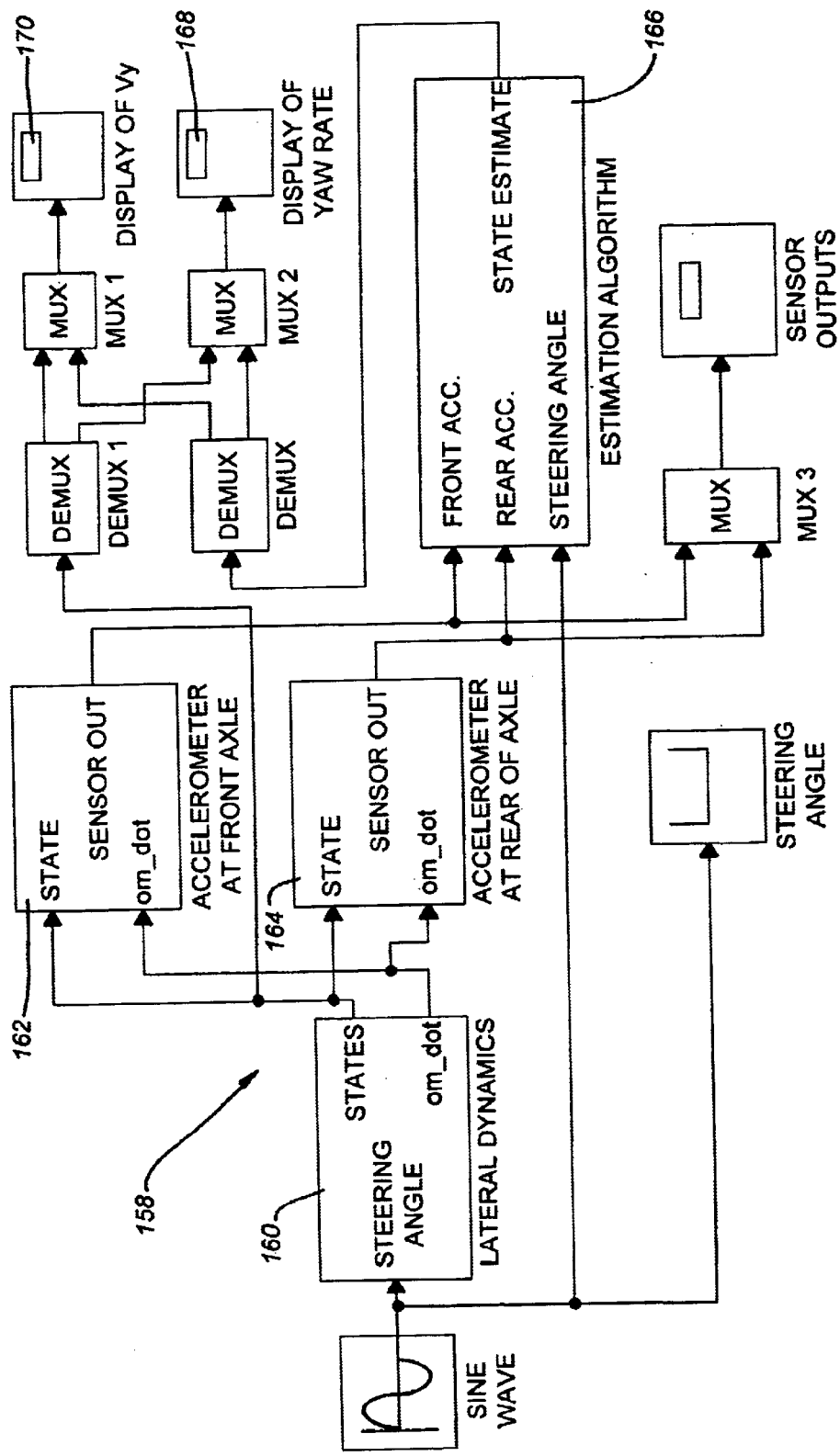
FIG. 10 is a simulation schematic used to model a preferred implementation of a method of estimating yaw rate.

FIG. 10 depicts a simulation model 158 implemented in MATLAB to test the yaw rate estimation algorithm as represented by the above equations. A lateral dynamics block 160 represents the bicycle model and is configured accordingly using one or more of the above equations. The outputs of the lateral dynamics block 160 are states of the bicycle model (lateral velocity and yaw rate) and the differential of yaw rate. Using the outputs, accelerometer simulation blocks 162 and 164 both output accelerations to simulate operation of accelerometers 34 and 36. Each accelerometer block 162 and 164 also includes a noise source based on uniformly distributed random variables. In this simulation model 158, where noise is evaluated, the noise range is selected as $\lfloor -0.2 \text{ m/s}^2, 0.2 \text{ m/s}^2 \rfloor$. In addition, the effect of tilt can be selectively implemented in this block.

The accelerations are provided to a state estimation algorithm block 166 that is configured with a yaw rate estimation algorithm of the invention. In this block 166, a discrete time version of the state estimation algorithm is implemented. The state estimation algorithm block 166 generates state estimation values. The estimated states are compared with original or prior states and displayed at 168 and 170. In one simulation, the speed of the vehicle 30 was selected as 31.1 m/sec, which is about 70 MPH. The bandwidth of the observer is chosen as 1.5 Hz, and the damping ratio is selected to be 0.8.

Figure 11:
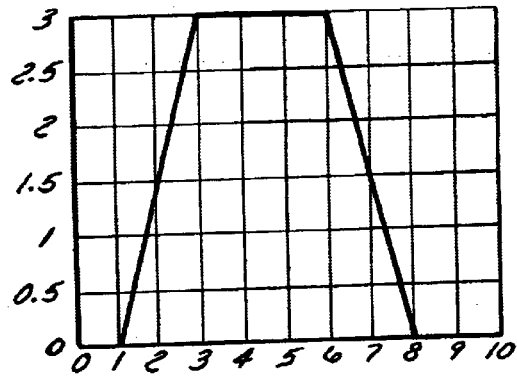
FIG. 11 is a plot of steering angle for a condition where there is no noise or tilt.
Figure 12A:
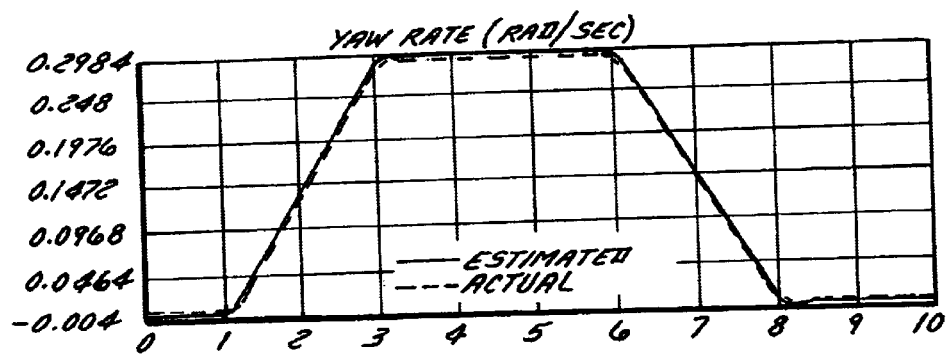
FIG. 12 depict plots of estimated yaw rate and error for the case where there is no noise or tilt.
Figure 12B:
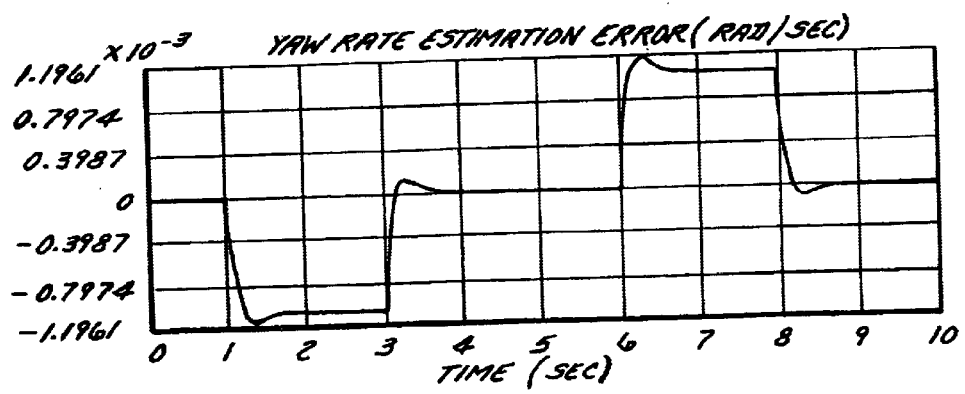
Figure 13:
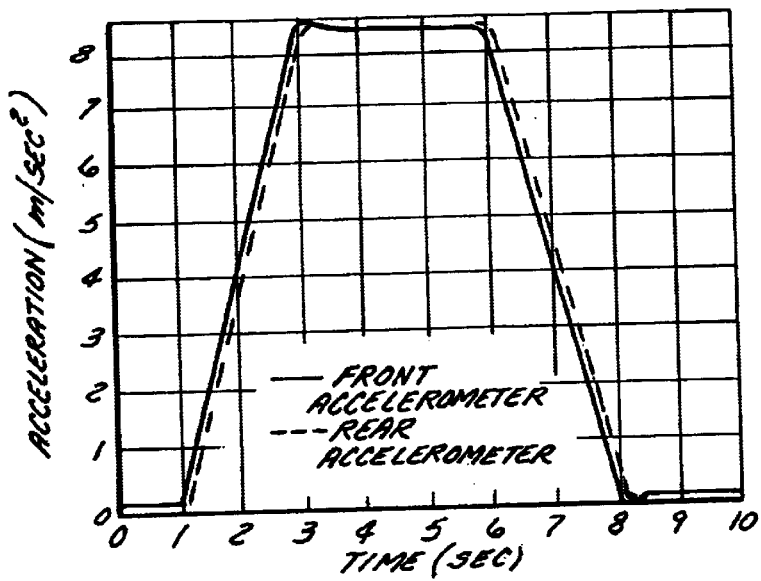
FIG. 13 depict accelerations outputted by a pair of accelerometers of the yaw rate estimation apparatus of the invention for the case where there is no noise or tilt.
Figure 14A:
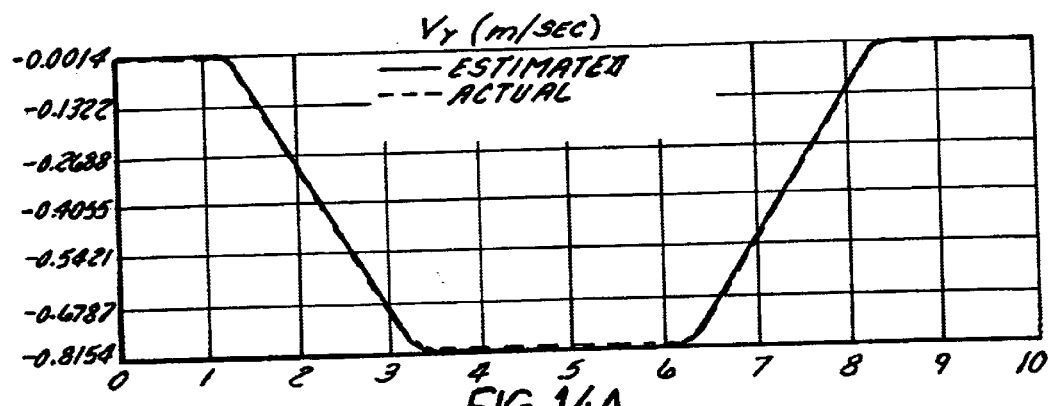
FIG. 14 depicts slip velocity estimation and error for the case where there is no noise or tilt.
Figure 14B:
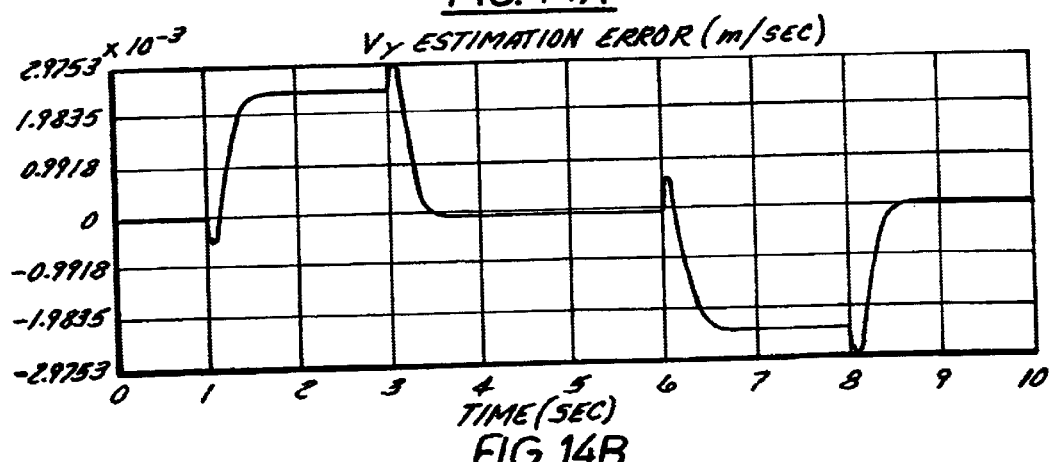

Referring to FIG. 11, the steering angle was selected to validate the yaw rate estimation algorithm. FIGS. 12-14 depict simulations using the yaw rate estimation algorithm for the ideal case where there is no tilt and no sensor noise. FIG. 12 shows the performance of the algorithm. The upper plot of FIG. 12 shows the comparison between the actual yaw rate and the estimated yaw rate determined using the algorithm. The lower plot of FIG. 12 shows estimation error. From the lower plot, it can be determined that the maximum error is $1.1961 \times 10^{-3}$ rad/sec and the relative error is 0.4008%.

FIG. 13 shows the measured accelerations from the accelerometers 34 and 36. The solid line represents the acceleration obtained from the front accelerometer 34. The dashed line represents the acceleration obtained from the rear accelerometer 36. Note that the difference between the two accelerometers 34 and 36 correlates with the slope of the yaw rate shown in FIG. 12. This behavior confirms Equation XVII. In other words, the difference between the output of the front accelerometer 34 and the output of the rear accelerometer 36 is about equal to the slope of the yaw rate FIG. 14 depicts estimation of the slip velocity. Note that the slip velocity cannot be measured directly using a sensor. Since the algorithm used to estimate yaw rate is a state estimation algorithm that is configured for states of the bicycle model, the slip velocity can also obtained using this same state algorithm. The maximum estimation error for the slip velocity is $2.9753 \times 10^{-3}$ m/sec. The maximum relative error is 0.3649%. Note that the estimation error for both the yaw rate and the slip velocity are less than 0.5%. Therefore, it is clear that the state estimation algorithm of the invention used to estimate yaw rate using inputs from the accelerometers 34 and 36 and the steer angle sensor 114 provides sufficient accuracy for control applications that includes vehicle stability control, lateral guidance applications, and traction control.

Using the simulation to investigate the effect of tilting of the sprung mass of the vehicle 30, generated either by rolling motion or super elevation, confirms that the effect of tilt is so negligible that it can be ignored during normal driving conditions. In order to simplify the simulation, it is assumed that the vehicle is maneuvered with a specified tilting angle. Thus, the effect of the tilt can be modeled in accordance with Equation XXXII.

Figure 15A:
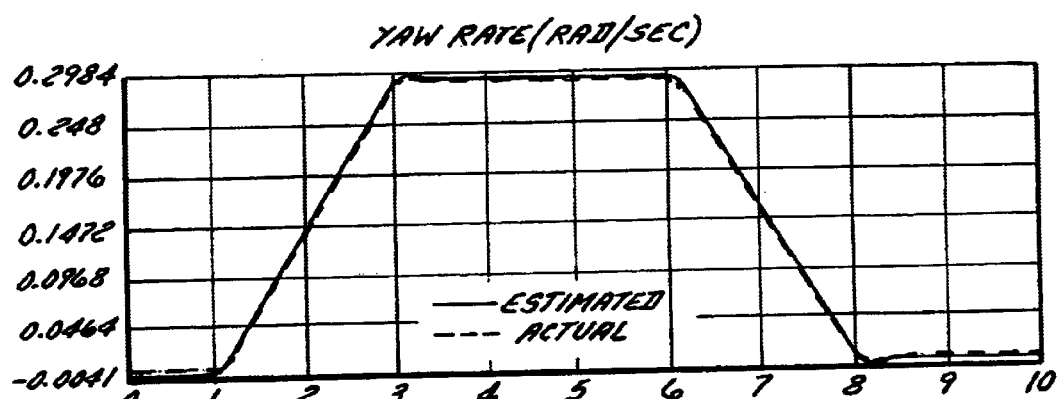
FIG. 15 depict plots of estimated yaw rate and error for the case where there is tilt but no noise.
Figure 15B:
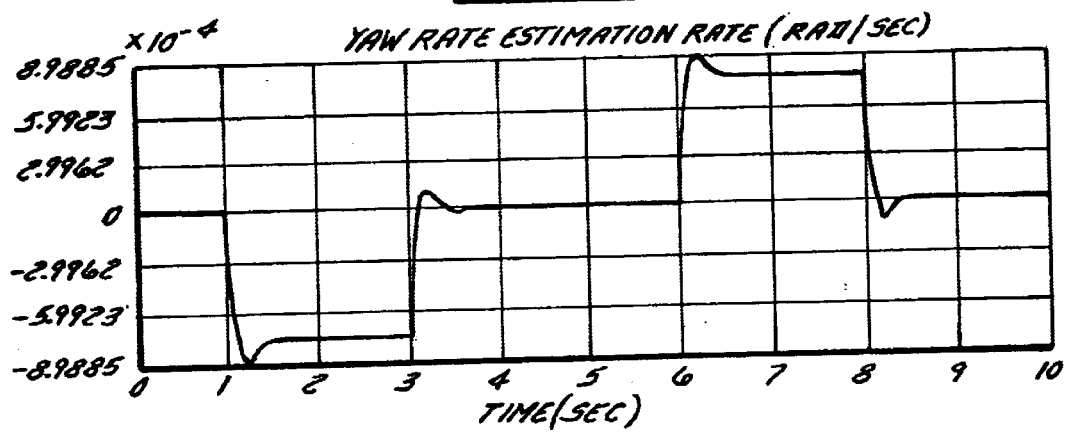

FIG. 15 shows yaw rate estimation when the tilting angle is 20°. Note that 20° of tilt angle is an extremely large magnitude of tilt. Tilt due to rolling motion and/or super-elevation typically is less than 10° during normal driving conditions. Using this rather large tilt angle value, the maximum error is $8.9885 \times 10^{-4}$ rad/sec, and relative error is 0.3012%. Note that estimation error for this fairly extreme case is actually even smaller than for the ideal case. This confirms that the effect of tilt is so negligible that it can be safely ignored in most cases.

Figure 16:
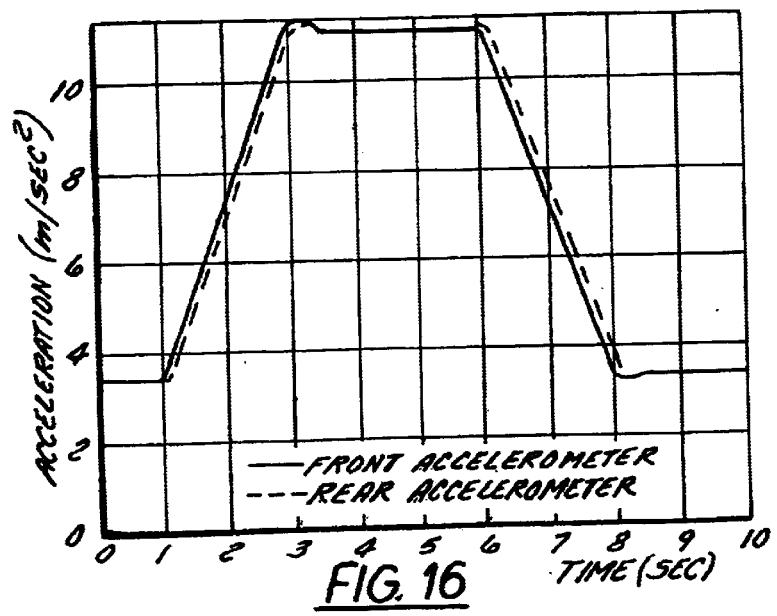
FIG. 16 depict accelerations outputted by a pair of accelerometers of the yaw rate estimation apparatus of the invention for the case where there is tilt but no noise.

FIG. 16 shows the accelerations measured by the accelerometers. Note that, due to tilt, the baseline of the accelerations is a nonzero value. The baseline acceleration is 3.552 m/sec$^2$, which is equal to about $9.81 \times \sin 20°$. FIG. 16 also can be used to show the slip velocity estimation and its estimation error. The maximum error is $1.945 \times 10^{-3}$ m/sec, and relative error is 0.2385%. It is clear from FIGS. 14–16, that the maximum relative estimation error is still less than 0.5%. Therefore, the algorithm of the invention is effective in spite of vehicle tilt.

Figure 17A:
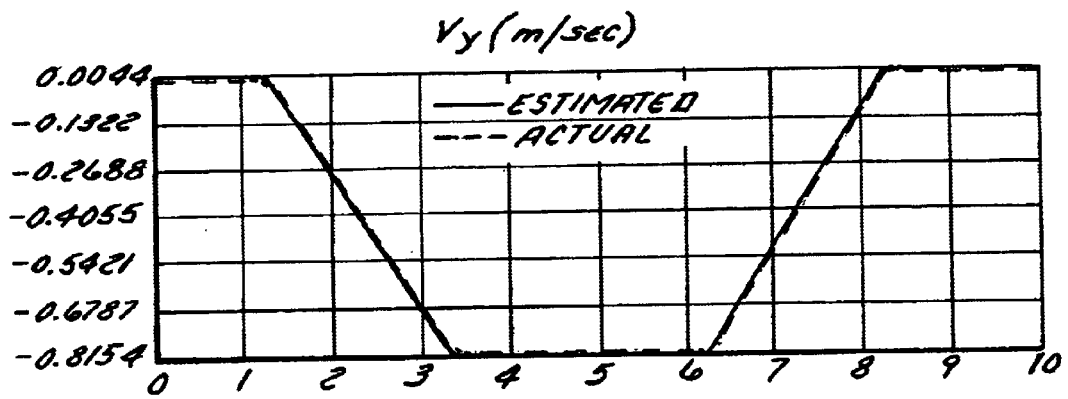
FIG. 17 depicts slip velocity estimation for the case where there is tilt but no noise.
Figure 17B:
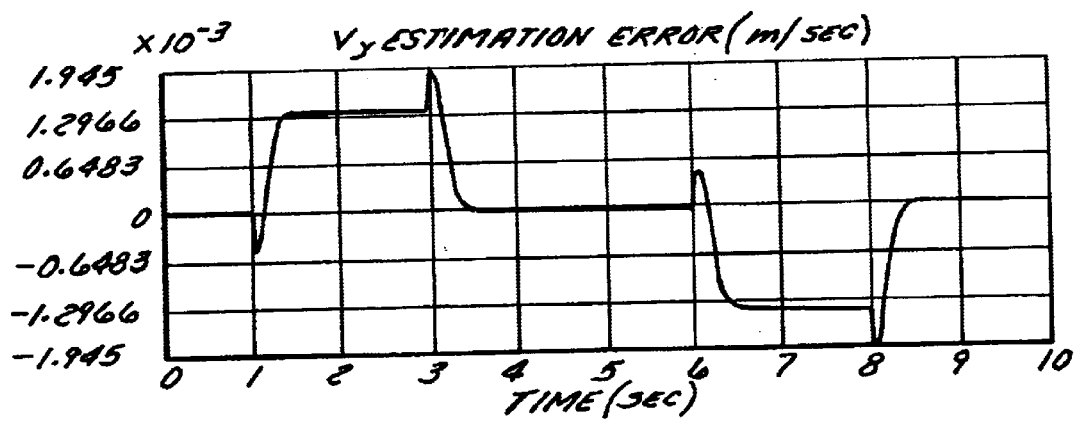

When the effect of sensor noise and tilt occurring at the same time is examined on the performance of the yaw rate estimation algorithm, it is clear that sensor noise impacts error more than vehicle tilt. Again, the tilt angle chosen for this simulation is 20°. The sensor noise is modeled as a uniformly random variable whose range is $\lfloor -0.2$ m/s$^2$, 0.2 m/s$^2 \rfloor$. FIG. 17 shows the yaw rate estimation when sensor noise is introduced. From this drawing figure, the maximum estimation error is about $2.2535 \times 10^{-3}$ rad/sec, and relative error is 0.7552%.

Figure 18A:
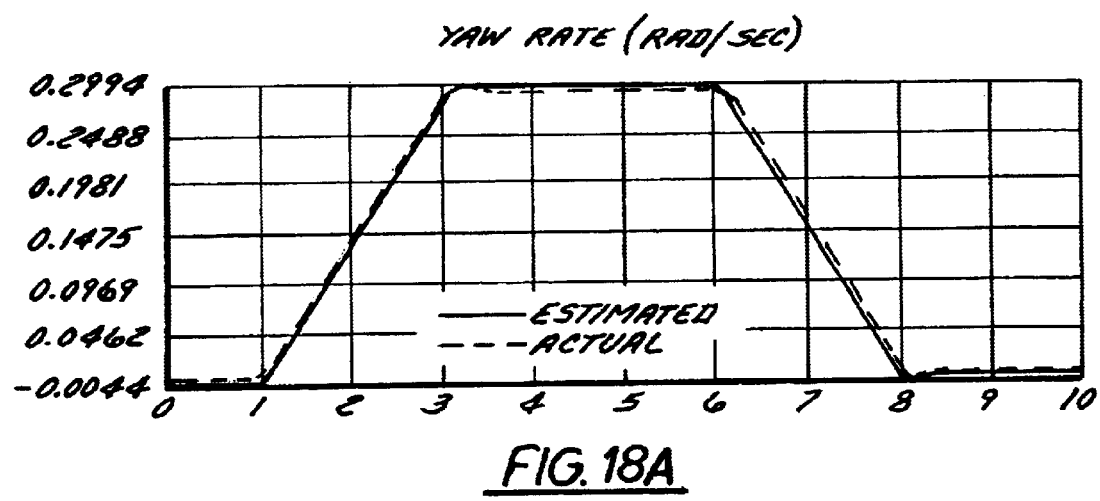
FIG. 18 depict plots of estimated yaw rate and error for the case where there is noise and tilt.
Figure 18B:
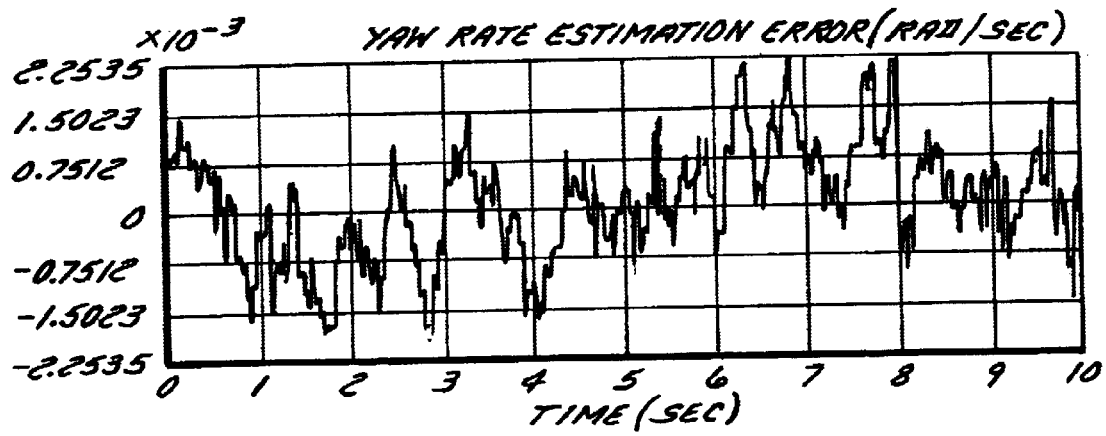

Note that this quantity amounts to almost 2.5 times the previous case where there was no sensor noise. It should also be noted, however, that the effect of sensor noise can be reduced by lowering the bandwidth of the observer. Unfortunately, if a lower bandwidth is used, the estimation algorithm will produce a significant phase lag and significant error can occur when there is discrepancy between the actual system parameters and the model parameters used for estimation algorithm design. Therefore, bandwidth cannot arbitrarily be reduced. The measured accelerations are shown in FIG. 18.

Figure 19:
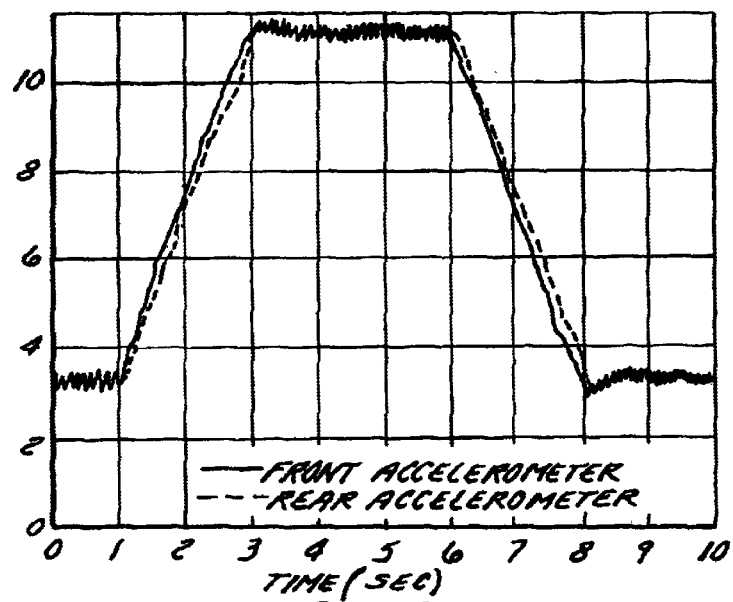
FIG. 19 depict accelerations outputted by a pair of accelerometers of the yaw rate estimation apparatus of the invention for the case where there is noise and tilt.
Figure 20A:
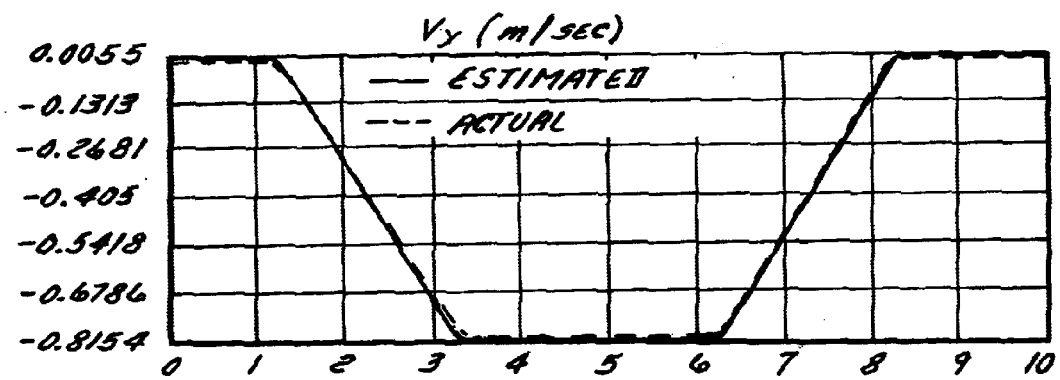
FIG. 20 depicts slip velocity estimation for the case where there is noise and tilt.
Figure 20B:
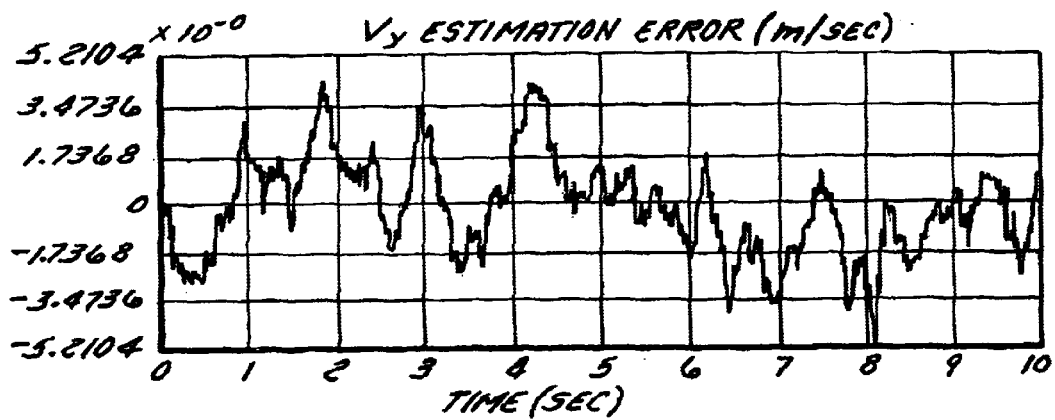

FIG. 19 depicts an estimation of the slip velocity for this same case. In this case, the maximum estimation error is $5.2104 \times 10^{-3}$ m/sec, and the relative error is 0.6390%. Compared to the prior case without sensor noise, the relative estimation error grows about 2.5 times. Based on the findings from FIGS. 18 and 20, sensor noise clearly is the dominant source of estimation error.

As a result, the yaw rate estimation algorithm of this invention can be used to reliably and repeatably estimate vehicle yaw rate using two accelerometers 34 and 36 that are installed along the centerline 40 of a vehicle 30. The effect of the tilt, generated either by rolling motion or by super-elevation, on the yaw rate estimation algorithm is negligible. While sensor noise appears to be the dominant source of estimation error, estimation error is still bounded by 1% such that it is still relatively low. As a result, the algorithm of this invention advantageously provides accurate and smooth estimation of vehicle yaw rate without using a gyroscope.

FIG. 21 illustrates a preferred implementation of a method of estimating yaw rate 172 of the invention using a statistical estimating algorithm. Accelerometer signals are respectively outputted from the front and rear accelerometer blocks 174 and 176 to the output computation block 178. Output computation block 178 processes the accelerometer signals to obtain a lateral acceleration value for each accelerometer 34 and 36. Both lateral acceleration values are inputted to the yaw rate estimation block 180. A steer angle outputted from steering angle measurement block 182 is also inputted into the yaw rate estimation computation block 180. The yaw rate estimation block 180 uses these three inputs, also referred to as state variables, which it processes to obtain an estimated yaw rate 184 and an estimated lateral velocity 186 that it outputs.

To reduce error in estimating yaw rate and lateral velocity, both estimates are fed back into estimated output computation block 188 along with the steering angle. These estimates and the steer angle are used to determine a correction value that is fed back into the yaw rate estimation computation block 180.

In a preferred implementation of the algorithm, the output computation block 178 inputs a lateral acceleration value, $a_{yf}$, from the front accelerometer 34, and a lateral acceleration value, $a_{yr}$, from the rear accelerometer 36, along with distances, $S_1$ and $S_2$, into Equation XVIII to obtain the value Y.

This value is fed to the yaw rate estimation computation block 180 where it is used, along with vehicle steer angle, $\delta$, as inputs into Equations XXII and XXIII to obtain estimate of yaw rate, $\hat{r}$, and an estimate of lateral velocity, $\hat{V}_y$. These two estimates are feed back into the estimated output computation block 188 where they are inputted into Equation XXIV to obtain a correction value, $\hat{Y}$. This correction value is then applied to the next value of outputted by the output computation block 188 after receiving the next set of lateral acceleration. Preferably, the correction is applied by offsetting or subtracting it from Y.

The resultant estimate of yaw rate obtained after each iteration of this method can be used preferably as an input to a vehicle stability control system, a vehicle traction control system, or the like. Preferably, this method is executed in real time during vehicle operation such that at least a plurality of yaw rate estimates are obtained each second.

It is also to be understood that, although the foregoing description and drawings describe and illustrate in detail one or more preferred embodiments of the present invention, to those skilled in the art to which the present invention relates, the present disclosure will suggest many modifications and constructions as well as widely differing embodiments and applications without thereby departing from the spirit and scope of the invention. The present invention, therefore, is intended to be limited only by the scope of the appended claims.

What is claimed is:

1. An apparatus for providing data from which a yaw rate for a heeled land vehicle can be estimated, the apparatus comprising:

a pair of spaced apart accelerometers disposed along a common longitudinal axis of the wheeled land vehicle with one of the accelerometers disposed forwardly of a center of gravity of the wheeled land vehicle and the other one of the accelerometers disposed rearwardly of the center of gravity of the wheeled land vehicle wherein each one of the accelerometers has a sensing axis that is disposed transversely and generally perpendicularly relative to the common longitudinal axis of the wheeled land vehicle; and a processor that processes signals from both of the accelerometers to obtain an estimate of yaw rate without processing any signal from a gyro, wherein the processor is configured to obtain the estimate of rate of change of yaw rate that is equal to a first result of acceleration provided by the accelerometer that is disposed forwardly of the center of gravity of the wheeled land vehicle minus an acceleration provided by the accelerometer that is dispose rearwardly of the center gravity of the wheeled land vehicle divided by a second result that is the sum of a first distance that is a distance between the accelerometer that is disposed forwardly of the center of gravity of the wheeled land vehicle and the center of gravity that is added to a second distance that is a distance between the accelerometer that is disposed rearwardly of the center of gravity of the wheel land vehicle and the center of gravity.

2. The apparatus of claim 1 further comprising a vehicle stability control system disposed on board the wheeled land vehicle that lacks a gyroscope and wherein a yaw rate obtained using the processor is fed to the vehicle stability control.

3. The apparatus of claim 1 further comprising a steer angle sensor on board the wheeled land vehicle and wherein the processor is further configured to take steer angle into account in determining a yaw rate.

4. The apparatus of claim 3 wherein the processor is further configured with a statistical estimating filter that seeks to drive yaw rate estimation error toward zero.

5. The apparatus of claim 3 wherein the statistical estimating filter comprises a Lewenberg filter.

6. The apparatus of claim 3 wherein the processor is configured with a state estimator.

7. The apparatus of claim 3 wherein error due to superelevation and roll is ignored when determining an estimate of yaw rate.

8. The apparatus of claim 1 wherein each accelerometer is a single axis accelerometer.

9. The apparatus of claim 1 wherein the common longitudinal axis extends through the center of mass of the wheeled land vehicle.

10. The apparatus of claim 1 wherein the common longitudinal axis is parallel to a longitudinally extending vehicle centerline that extends through the center of mass of the wheeled land vehicle.

11. The apparatus of claim 1 wherein both of the accelerometers are disposed in the wheeled land vehicle.

12. An apparatus for providing data from which a yaw rate for a wheeled land vehicle can be determined, the apparatus comprising:

a pair of spaced apart accelerometers with one of the accelerometers being disposed rearwardly of a center of mass of the wheeled land vehicle and the other one of the accelerometers being disposed forwardly of a center of mass of the wheeled land vehicle and both of the sensors disposed along an axis that is parallel to a vehicle centerline;

a steer angle sensor;

a processor configured to process signals or data from the accelerometers and the steer angle sensor in real time during operation of the wheeled land vehicle and output an estimate of yaw rate; and a vehicle stability control system that uses the estimate of yaw rate in determining whether to activate the vehicle stability control system.

13. The apparatus of claim 12 wherein the processor is configured to output an estimate of lateral velocity and configured with a state estimation algorithm that generates a correction used in estimating yaw rate using a previously estimated yaw rate, a previously estimated lateral velocity, and signals or data from the steer angle.

14. The apparatus of claim 13 wherein the state estimation algorithm comprises a statistical estimating filter.

15. The apparatus of claim 14 wherein the state estimation algorithm comprises a Lewenberg filter.

16. The apparatus of claim 12 wherein the vehicle stability control system compares the yaw rate estimate with a yaw rate threshold to determine whether to activate the vehicle stability control system to increase vehicle stability.

17. A method of estimating yaw rate for a wheeled land vehicle comprising:

(a) providing a processor, a steer angle sensor, and a pair of spaced apart accelerometers disposed on board the wheeled land vehicle with a first one of the accelerometers spaced a first distance from a center of mass of the wheeled land vehicle and a second one of the accelerometers spaced a second distance from the center of mass of the wheeled land vehicle;

(b) obtaining lateral accelerations from the accelerometers;

(c) obtaining a steer angle from the steer angle sensor;

(d) estimating a rate of change of yaw rate using the lateral accelerations; and (e) estimating a yaw rate using the rate of change of yaw rate and the steer angle.

18. The method according to claim 17 wherein before step (e) an error correction offset is applied to the rate of change of yaw rate estimate obtained in step (d) using feedback based on the prior estimated yaw rate and the present steer angle.

19. An apparatus for providing data from which a yaw rate for a wheeled land vehicle can be estimated, the apparatus comprising:

a pair of spaced apart accelerometers disposed along a common axis of the wheeled land vehicle with a first one of the accelerometers spaced a first distance from and disposed on one side of a center of gravity of the wheeled land vehicle and a second one of the accelerometers spaced a second distance from and disposed on the other side of the center of gravity of the wheeled land vehicle; and a processor configured to determine an estimate of rate of change of yaw rate by determining the result of a difference between lateral accelerations obtained from the first and second accelerometers divided by the sum of the first and second distances.

20. The apparatus of claim 19 further comprising a steer angle sensor having a steering angle output, wherein the processor is further configured to use the steering angle output and the estimate of rate of change of yaw rate in determining an estimate of yaw rate.

21. The apparatus of claim 20 wherein the processor is further configured to use the steering angle output and the estimate of rate of change of yaw rate in determining an estimate of lateral velocity.

22. The apparatus of claim 21 wherein the processor is further configured to receive and use the estimate of yaw rate, the estimate of lateral velocity, and a steering angle output in determining a correction that is applied to an estimate of rate of change of yaw rate before the estimate of rate of change of yaw rate is used in determining a subsequent estimate of yaw rate.

23. An apparatus for providing data from which a yaw rate for a wheeled land vehicle can be estimated, the apparatus comprising:

a pair of spaced apart accelerometers disposed along a common axis of the wheeled land vehicle with a first one of the accelerometers spaced a first distance from and disposed on one side of a center of gravity of the wheeled land vehicle and a second one of the accelerometers spaced a second distance from and disposed on the other side of the center of gravity of the wheeled land vehicle;

a steer angle sensor; and a processor configured to determine (a) an estimate of rate of change of yaw rate using data obtained from the first and second accelerometers, and (b) an estimate of yaw rate using data from the steer angle sensor and the estimate of rate of change of yaw rate.

24. An apparatus for providing data from which a yaw rate for a wheeled land vehicle can be estimated, the apparatus comprising:

a pair spaced apart accelerometers disposed along a common axis of the wheeled land vehicle with a first one of the accelerometers spaced a first distance from and disposed on one side of a center of gravity of the wheeled land vehicle and a second one of the accelerometer spaced a second distance from and disposed on the other side of the center of gravity of the wheeled land vehicle;

a steer angle sensor; and a processor that determines (a) an estimate of rate of change of yaw rate using data obtained from the first and second accelerometers, (b) an estimate of yaw rate and an estimate of lateral velocity using data from the steer angle sensor and the estimate of rate of change of yaw rate, and (c) a corection that is applied to a subsequent estimate of rate of change of yaw rate using the estimate of yaw rate, the estimate of lateral velocity, and subsequent data from the steer angle sensor.

25. An apparatus for providing data from which a yaw rate for a wheeled land vehicle can be estimated, the apparatus comprising:

a pair of spaced apart single axis accelerometers disposed along a common axis of the wheeled land vehicle that is parallel to or coincident with a longitudinal vehicle centerline that extends through a center og gravity of the wheeled land vehicle with a first one of the accelerometers located forwardly of the center of gravity and spaced a first distance therefrom and a second one of the accelerometers located rearwardly of the center of gravity and spaced a second distance therefrom;

a steer angle sensor;

a processor configured to determine an estimate of rate of change of yaw rate by obtaining the result of a difference between lateral accelerations obtained from the first and second accelerometers divided by the sum of the first and second distances, and then use the estimate of rate of change of yaw rate and a steer angle from the steer angle sensor to determine an estimate of yaw rate; and wherein no gyro is used in the determination of the estimate of yaw rate.

26. A method of estimating yaw rate for a wheeled land vehicle comprising:

(a) providing a processor, a steer angle sensor, and a pair of spaced apart accelerometers disposed on board the wheeled land vehicle with a first one of the accelerometers spaced a first distance from a center of mass of the wheeled land vehicle and a second one of the accelerometers spaced a second distance from the center of mass of the wheeled land vehicle;

(b) obtaining lateral accelerations from the accelerometers;

(c) obtaining a steer angle from the steer angle sensor;

(d) estimating a rate of change of yaw rate by obtaining the difference between lateral accelerations divided by the sum of the first and second distances;

(e) estimating a yaw rate using the rate of change of yaw rate and the steer angle.

27. A method of estimating yaw rate for a wheeled land vehicle comprising:

(a) providing a processor, a steer angle sensor, and a pair of spaced apart accelerometers disposed on board the wheeled land vehicle with a first one of the accelerometers spaced a first distance from a center of mass of the wheeled land vehicle and a second one of the accelerometers spaced a second distance from the center of mass of the wheeled land vehicle;

(b) obtaining lateral accelerations from the accelerometers;

(c) obtaining a steer angle from the steer angle sensor;

(d) estimating a rate of change of yaw rate;

(e) estimating a yaw rate using the rate of change of yaw rate estimate and the steer angle;

(f) estimating alateral velocity using the rate of change of yaw rate estimate and the steer angle;

(g) obtaining a subsequent steer angle;

(h) determining a correction to rate of change of yaw rate using the yaw rate estimate, the lateral velocity estimate and the subsequent steer angle; and (i) applying the correction to a subsequent rate of change of yaw rate estimate in step (d).

28. An apparatus for providing data from which a yaw rate for a wheeled land vehicle can be estimated, the apparatus comprising:

a pair of spaced apart accelerometers disposed along a common axis of the wheeled land vehicle with one of the accelerometers located in front of the center of gravity of the wheeled land vehicle and the other one of the accelerometers located behind the center of gravity of the wheeled land vehicle;

a steer angle sensor;

a processor configured to determine an setimate of rate of change of yaw rate using the following equation:

$$\dot{r} = \frac{a_{yf} - a_{yr}}{S_1 + S_2}$$

where $\dot{r}$ is rate of change of yaw rate, $a_{yf}$ is a value of acceleration from the accelerometer located in front of the center of gravity of the wheeled land vehicle, $a_{yr}$ is a value of acceleration from the accelerometer located behind the center of gravity of the wheeled land vehicle, $S_1$ is a distance in a longitudinal direction from the accelerometer located in front of the center of gravity of the wheeled land vehicle to the center of gravity, and $S_2$ is a distance in a longitudinal direction from the accelerometer located behind of the center of gravity of the wheeled land vehicle.

29. An apparatus for providing data from which a yaw rate for a wheeled land vehicle can be estimated, the apparatus comprising:

a pair of spaced apart accelerometers disposed along a common axis of the wheeled land vehicle with one of the accelerometers located in front of the center of gravity of the wheeled land vehicle and the other one of the accelerometers located behind the center of gravity of the wheeled land vehicle;

a steer angle sensor;

a processor configured to determine (a) an estimate of yaw rate using data from the accelerometers, data from the steer angle sensor, and an error correction value, (b) an estimate of lateral velocity using the data from the accelerometers and the steer angle sensor, and (c) a subsequent value of the error correction value using the current estimate of yaw rate, the current estimate of lateral acceleration, and data from the steer angle sensor; and a vehicle stability control system that uses the estimate of yaw rate.

* * * * *